(12) United States Patent
Ohtake et al.

(10) Patent No.: US 6,271,973 B1
(45) Date of Patent: Aug. 7, 2001

(54) VARIABLE FOCAL LENGTH LENS SYSTEM

(75) Inventors: Motoyuki Ohtake, Kawasaki; Satoshi Hayakawa, Urawa, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/442,409

(22) Filed: Nov. 18, 1999

(30) Foreign Application Priority Data

| Nov. 19, 1998 | (JP) | 10-329500 |
| Apr. 20, 1999 | (JP) | 11-112753 |
| Apr. 23, 1999 | (JP) | 11-116897 |

(51) Int. Cl.$^7$ ............................ G02B 15/14; G02B 13/18
(52) U.S. Cl. ........................................ 359/689; 359/714
(58) Field of Search .................... 359/689, 683, 359/686, 708, 714

(56) References Cited

U.S. PATENT DOCUMENTS

| 5,148,321 | 9/1992 | Goto et al. | 359/689 |
| 5,831,772 | 11/1998 | Nishio et al. | 359/689 |
| 6,061,187 | * 5/2000 | Kang | 359/689 |

FOREIGN PATENT DOCUMENTS

| 3-282409 | 12/1991 | (JP) . |
| 6-265787 | 9/1994 | (JP) . |
| 6-294932 | 10/1994 | (JP) . |

* cited by examiner

*Primary Examiner*—Scott J. Sugarman
(74) *Attorney, Agent, or Firm*—Miles & Stockbridge PC

(57) ABSTRACT

A variable magnification optical system of reduced size and increased zoom ratio is provided. According to one aspect, a first lens group having a positive refractive power, a second lens group having a positive refractive power disposed to the image side of the first lens group, and a third lens group having a negative refractive power disposed to the image side of the second lens group are provided. When the system goes from a wide-angle end state to a telephoto end state, the first lens group, the second lens group, and the third lens group are moved toward the object in such a manner that a space between the first lens group and the second lens group is increased, and a space between the second lens group and the third lens group is decreased. In this case, a ratio of the focal length of the first lens group to that of the lens system in the telephoto end state satisfies a particular condition.

24 Claims, 11 Drawing Sheets

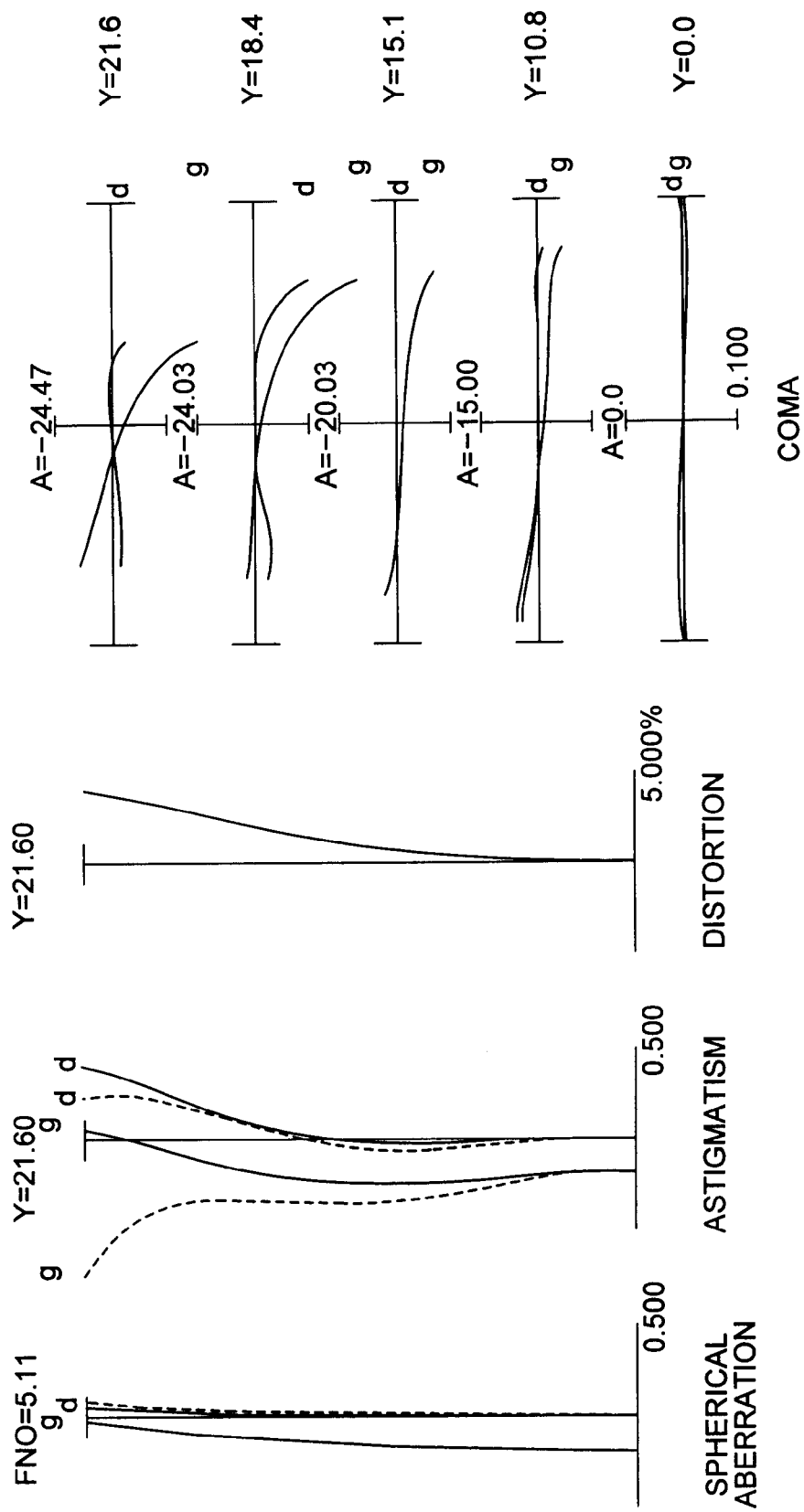

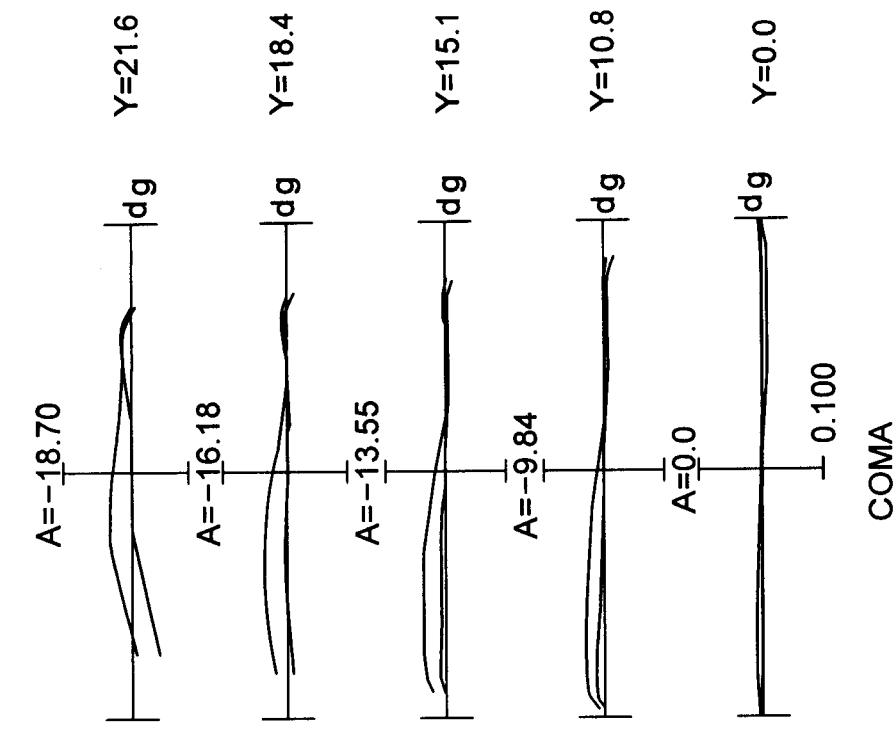
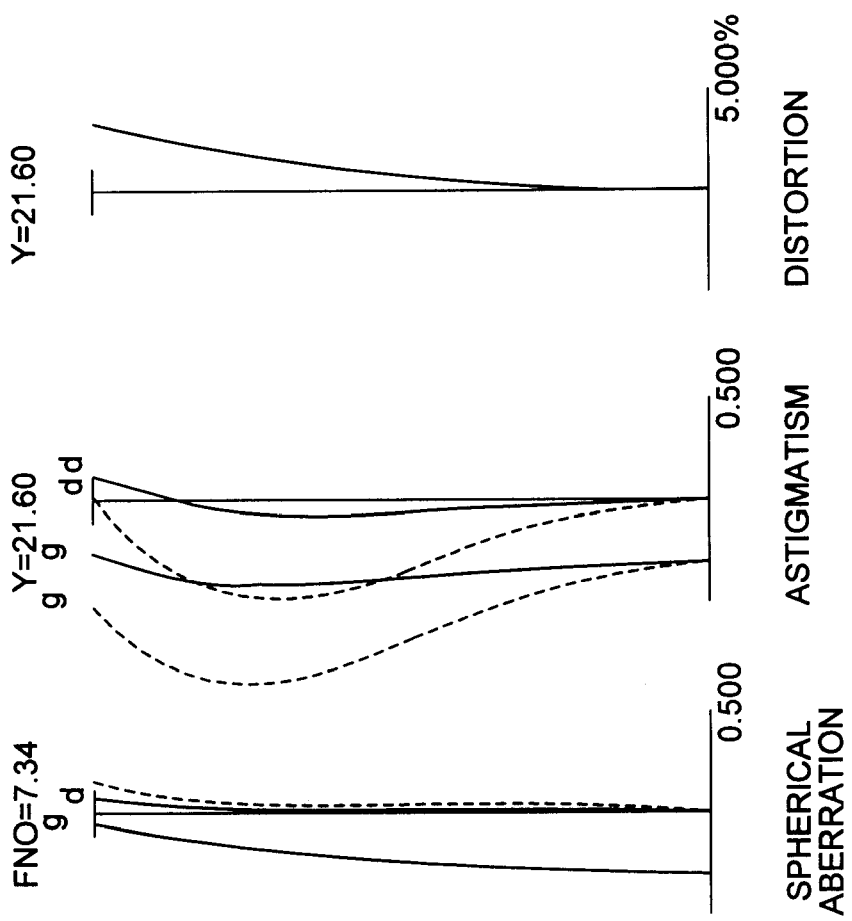
Fig. 9A  Fig. 9B  Fig. 9C  Fig. 9D

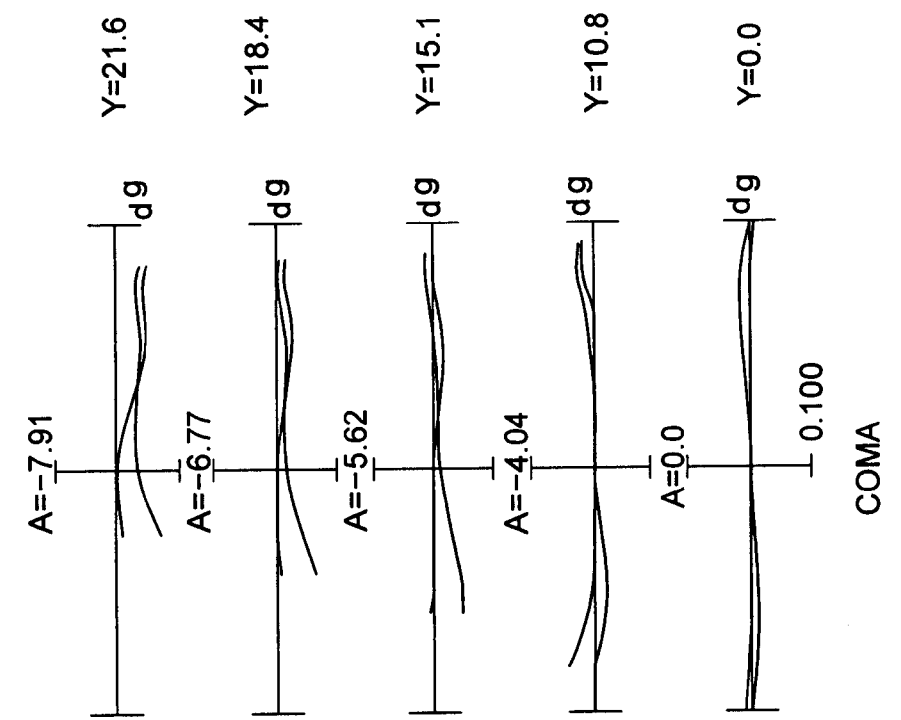
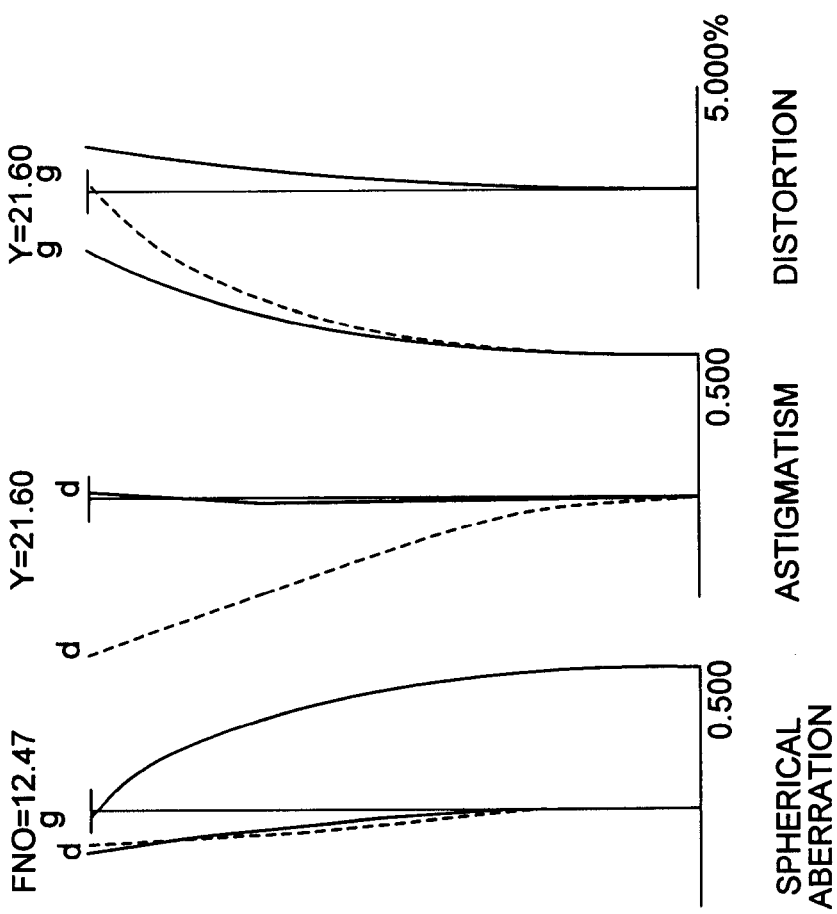
Fig. 11A  Fig. 11B  Fig. 11C  Fig. 11D

VARIABLE FOCAL LENGTH LENS SYSTEM

This application claims the benefit of Japanese Patent Applications Nos. 10-329500, 11-112753, and 11-116897 which are hereby incorporated by references.

BACKGROUND OF THE INVENTION

1. Field of the Invention

The present invention relates to a variable focal length lens system and, in particular, relates to a variable focal length lens system having a compactness and a large zoom ratio suitable for an objective lens used for a lens shutter type camera.

2. Related Background Art

It has recently become common to use a zoom lens in a picture-taking optical system for a camera. In particular, since portability is regarded as important for a lens shutter type camera, In order to reduce size and weight of a camera itself, a small-sized lightweight zoom lens used for an objective lens is proposed.

As a zoom lens has become popular for an objective lens, various proposals have been made regarding a zoom lens having a long focal length in a telephoto end state and a large zoom ratio (a quotient of a focal length in the telephoto end state divided by a focal length in the wide-angle end state). A long focal length in the telephoto end state makes it possible to take picture closer to an object and a large zoom ratio makes it possible to take picture with high degree of freedom.

In these zoom lenses, because of the long focal lengths in the telephoto end state, the total lens lengths in the telephoto end state become long, so that the portability is spoiled. Therefore, the portability while being carried not for taking picture is improved by means of storing lens groups in the camera body in a state where the distances between adjacent lens groups are made minimum. By using such structure for the lens barrel that plurality of lens barrel elements are nested, it is possible to accommodate each lens barrel element as if the lens barrel element is folded when the camera is carried, so the portability while being carried is improved.

However, as the focal length in the telephoto end state becomes long, the barrel length also becomes long, so that each lens barrel element consisting of the lens barrel also becomes long. Then, the portability is spoiled in consequence. Accordingly, it is conceivable to reduce the thickness of the camera body while being accommodated by means of increasing the number of lens barrel element and, then, reducing the thickness of each lens barrel element. On the contrary in this case, however, the height and width of the camera become larger because the diameter of each barrel becomes larger, so the portability is also spoiled.

According to an optical design, it can be conceivable to avoid inconvenience of portability by means of shortening the total length of the lens in the telephoto end state. In a conventional zoom lens, in order to shorten the total length of the lens system in the telephoto end state, it is necessary to increase refractive power of each lens group or to increase the number of movable lens group. Because of the increase of the number of the lens element in each case, this is the result is contrary to objections of compactness and lightweight design and, therefore, contrary to the objective of good portability.

SUMMARY OF THE INVENTION

The present invention is made in view of the aforementioned problems and has an object to provide a compact variable focal length lens system suitable for a large zoom ratio with small number of lens elements.

According to one aspect of the present invention, a variable focal length lens system includes a first lens group having a positive refractive power, a second lens group having a positive refractive power disposed to an image side of the first lens group, and a third lens group having a negative refractive power disposed to the image side of the second lens group. The first lens group, the second lens group, and the third lens group are moved toward the object in such a manner that a space(air gap) between the first lens group and the second lens group is increased, and a space(air gap) between the second lens group and the third lens group is decreased when the system goes from a wide-angle end state to a telephoto end state. The following condition is satisfied:

$$0.28 < f1/ft < 0.48;$$

where f1 denotes a focal length of the first lens group, and ft denotes a focal length of the lens system in the telephoto end state.

In one preferred embodiment of the present invention, the second lens group is comprised of an aperture diaphragm, a negative sub lens group having a negative refractive power arranged to the object side of the aperture diaphragm, and a positive sub lens group having a positive refractive power arranged to the image side of the aperture diaphragm. The following condition is satisfied:

$$0.4 < f2/(fw \cdot ft)^{1/2} < 0.8;$$

where f2 denotes a focal length of the second lens group, fw denotes a focal length of the lens system in the wide-angle end state, and ft denotes the focal length of the lens system in the telephoto end state.

In one preferred embodiment of the present invention, the following condition is satisfied:

$$0.15 < \Delta1/f1 < 0.3;$$

where $\Delta1$ denotes a variation of a space(air gap) along the optical axis between the first lens group and the second lens group when the system goes from the wide-angle end state to the telephoto end state, and f1 denotes the focal length of the first lens group.

According to another aspect of the present invention, the following condition is satisfied:

$$1.10 < f12T/f12W < 1.50;$$

where f12W denotes a combined focal length of the first lens group and the second lens group in the wide-angle end state, and f12T denotes a combined focal length of the first lens group and the second lens group in the telephoto end state.

According to another aspect of the present invention, the following condition is satisfied:

$$0.3 < fw \cdot \Delta1/(f1 \cdot f2) < 0.45;$$

where fw denotes a focal length of the variable focal length optical system in the wide-angle end state, $\Delta1$ denotes a variation of the space(air gap) between the first lens group and the second lens group when the system goes from the wide-angle end state to the telephoto end state, f1 denotes a focal length of the first lens group, and f2 denotes a focal length of the second lens group.

In a three-group type zoom lens according to prior art comprising, from the object side, a positive lens group, a positive lens group and a negative lens group, variation of a lateral magnification of the third lens group is very large when a state of the focal length changes from a wide-angle end state to a telephoto end state. In this case, the following inconveniences (I) and (II) come out.

(I) Since the lateral magnification of the third lens group in the telephoto end state is large, the total length of the lens system becomes larger.

(II) Since the lateral magnification of the third lens group in the wide-angle end state is small, a sufficient back focus cannot be secured, so that the diameter of the lens system becomes larger.

Since the zooming ratio according to prior art has been just over three, the focal length in the telephoto end state has been rather short, so that the magnitude of the total length of the lens system has not affected much. If the zooming ratio becomes larger, then the magnitude of the total length of the lens system may cause big problem. Moreover, because the oversized lens diameter makes the width and height of the camera body larger, it does not meet the demand of the market for portability.

Therefore, in the present invention, controlling the variation of the lateral magnification of the third lens group from the wide-angle end state to the telephoto end state, the compactness of the total length of the lens system and the compactness of the diameter of the lens system are intended. To give an actual example in the present invention, a variable focal length optical system, in order from the object side, comprise:

a first lens group having a positive refractive power, a second lens group having a positive refractive power, and a third lens group having a negative refractive power, wherein said each lens group moves to the object side in such a way that space(air gap) between said first lens group and said second lens group is increased, and a space(air gap) between said second lens group and said third lens group is decreased when the focal length of the lens system varies from a wide-angle end state where the focal length is the shortest to a telephoto end state where the focal length is the longest, wherein an optical system suitable for compactness of lens diameter and for shortening the total length of the lens system is provided by satisfying the following conditions from (A) to (C);

(A) The positive refractive power of the first lens group is made stronger, and the space(air gap) between the first lens group and the second lens group is made to vary actively.

(B) The second lens group is further comprising a negative sub lens group having a negative refractive power disposed to the object side of an aperture diaphragm and a positive sub lens group having a positive refractive power disposed to the image side of the aperture diaphragm.

(C) The negative sub lens group of the second lens group is further comprising a negative lens element and a positive lens element.

The condition (A) eases the variation of the lateral magnification of the third lens group when the lens-group positions are moved. In the present invention, by means of making stronger the positive refractive power of the first lens group, the space(air gap) between the first lens group and the second lens group is made to vary actively when the lens-group positions are moved, so that the variation of the lateral magnification of the second lens group becomes larger, and, finally, the lateral magnification of the third lens group can be eased.

However, there arise some problems caused by changing the location of the refractive power of each lens group. Therefore, the other conditions (B) and (C) should also be satisfied in the present invention to solve these problems.

The condition (B) relates to the composition of the second lens group and to the arrangement of the aperture diaphragm. In a variable focal length lens system having a high zoom ratio, it is important to arrange an aperture diaphragm at about the center of the lens system. In the present invention, by means of arranging the aperture diaphragm in the second lens group, the space(air gap) between the first lens group and the second lens group becomes wider(i.e. larger) when the state of lens group positions is changed from the wide-angle end state to the telephoto end state, so that off-axis light flux passing through the first lens group is away from the optical axis of the zoom lens. On the other hand, since the third lens group moves to the object side in such a way that the space(air gap) between the second lens group and the third lens group becomes narrower(i.e. smaller), off-axis light flux passing through the third lens group is closer to the optical axis of the zoom lens. Accordingly, excellent correction for variation of coma occurred by way of a change in each lens position can be made by means of actively varying the height of off-axis light flux passing through the first lens group and the third lens group.

For example, in each embodiment disclosed in Japanese Patent Laid-Open Publication No. 6-265787, since an aperture diaphragm is arranged to the image side of the second lens group, the lens groups located to the object side of the aperture diaphragm has a strong positive refractive power and the lens groups located to the image side of the aperture diaphragm has a negative refractive power. Therefore, it is not suitable for correcting distortion, and even causes such a problem that the correction of upper coma cannot be performed sufficiently when the zoom ratio becomes high because upper coma is corrected by the third lens group only.

On the contrary, in each embodiment disclosed in Japanese Patent Laid-Open Publication No. 6-294932, since an aperture diaphragm is arranged at the object side of a second lens group, off-axis light flux passing through a third lens group is away from the optical axis. Therefore, the diameter of the lens cannot be made compact.

In the present invention, the second lens group is comprised of a negative sub lens group and a positive sub lens group arranged to the image side of the negative sub lens group. The function of correcting aberrations is separated into two parts. One is a part corrected by the lens groups arranged to the object side of the aperture diaphragm (the first lens group and the negative sub lens group). And the other is a part corrected by the lens groups arranged to the image side of the aperture diaphragm (the positive sub lens group and the third lens group). Then, mainly the object-side lens groups correct upper coma occurring by way of a change in each lens position, and the image-side lens groups correct lower coma and, therefore, good optical performance is obtained.

The condition (C) is for satisfactorily correcting a chromatic aberration. Generally, in a zoom lens having high zooming ratio, the incident angle of off-axis light flux changes significantly when the state of lens group positions is changed while zooming. Therefore, the variation of coma relative to the wavelength is liable to become larger, particularly in the wide-angle end state where the incident angle is large.

In the present invention, in order to correct the variation of coma relative to the wavelength, the negative sub lens group of the second lens group is further comprising a negative lens element and a positive lens element. Furthermore, the positive sub lens group of the second lens group is further comprising a positive lens element and a negative lens element. By means of correcting chromatic aberration by the negative sub lens group, the variation of coma relative to the wavelength is corrected.

Although the same effect can be obtained when either the positive sub lens group or the negative sub lens group is composed of more than three lens elements, the more the number of lens elements, the thicker the dimension along the optical axis, so that the diameter of the lens becomes larger. Therefore, it is desirable that each sub lens group, the positive sub lens group and the negative sub lens group, is composed of two lens elements.

BRIEF DESCRIPTION OF THE DRAWINGS

FIGS. 8A to 8D are graphs showing various aberrations in the wide-angle end state when the optical system is focused at infinity.

FIGS. 9A to 9D are graphs showing various aberrations in the first intermediate focal length state when the optical system is focused at infinity.

FIGS. 11A to 11D are graphs showing various aberrations in the telephoto end state when the optical system is focused at infinity.

DESCRIPTION OF THE PREFERRED EMBODIMENTS

Each Embodiment of the present invention is described below with reference to the attached figures.

Figure 1:
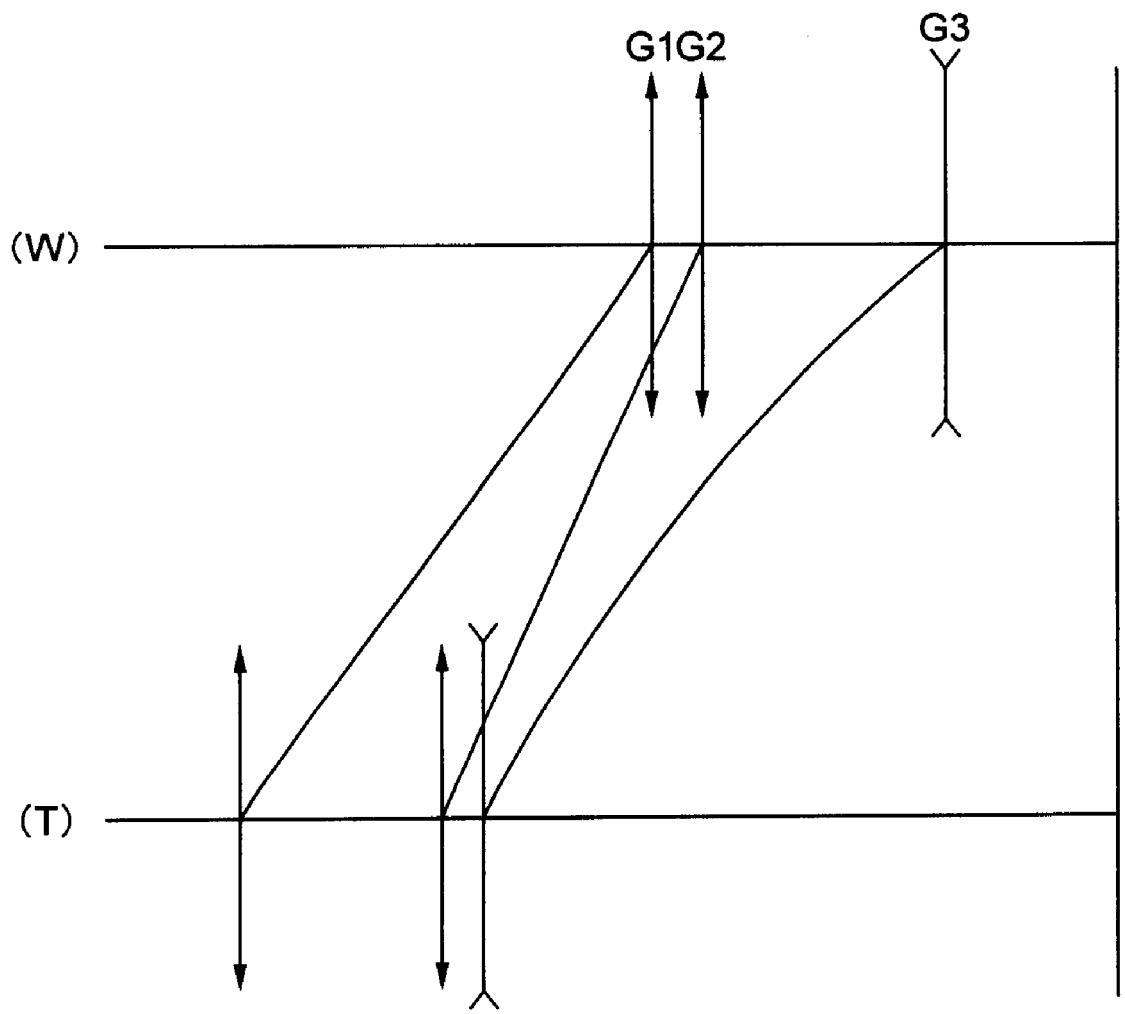
FIG. 1 is a diagram showing a distribution of refractive power in a variable focal length optical system according to each embodiment of the present invention and represents a change in state of lens group positions from the wide-angle end state (W) to the telephoto end state (T).

FIG. 1 shows distribution of refractive power and change of the state of lens group positions from the wide-angle end state (W) to the telephoto end state (T) in variable magnification optical system according to each Embodiment of the present invention.

As shown in FIG. 1, the variable magnification optical system includes, in order from the object side, a first lens group G1 having positive refractive power, a second lens group G2 having positive refractive power, and a third lens group G3 having negative refractive power. When the state of lens group positions is changed from the wide-angle end state to the telephoto end state (so called "zoom"), the first lens group G1 through the third lens group G3 all move to the object side in such a way that the space(air gap) between the first lens group and the second lens group becomes larger, and that the space(air gap) between the second lens group and the third lens group becomes smaller.

In each Embodiment, an aspherical surface is expressed by the following equation in which the height in a vertical direction relative to the optical axis is y, displacement in the optical axis direction at the height y (sag amount) is S(y), a standard radius of curvature is R, the conical coefficient is κ and n-th order aspherical surface coefficient is $C_n$;

$$S(y)=(y^2/R)/\{1+(1-\kappa \cdot y^2/R^2)^{1/2}\}+C_4 \cdot y^4+C_6 \cdot y^6+C_8 \cdot y^8+C_{10} \cdot y^{10}.$$

In the respective Embodiments, the second order aspherical surface coefficient $C_2$ is zero and the standard radius of curvature R is equal to the paraxial radius of curvature r and the aspherical surface is denoted by adding a mark "*" to the right side of the surface number.

(First through Fourth Embodiments)

In the present Embodiments 1 through 4, the condition (1) is satisfied.

$$0.28<f1/ft<0.48 \qquad (1)$$

Wherein f1 denotes a focal length of a first lens group and ft denotes a focal length of a lens system in the telephoto end state.

Condition (1) defines an appropriate range of the focal length f1 of the first lens group in order to satisfy both compactness and high quality.

When condition (1) exceeds the upper limit of condition (1), a convergence effect provided by the first lens group becomes weaker and, therefore, the size of the lens system in the telephoto end state cannot be shortened enough.

On the other hand, when condition (1) falls below the lower limit, the off-axis light flux passing through the first lens group passes away from the optical axis in the telephoto end state, so that off-axis aberration cannot be corrected well. Therefore, it cannot be expected to make it high quality.

Further, in order to make it higher quality in the present first through fourth embodiments, it is desirable to make lower limit of condition (1) 0.32. It is desirable for the present first through fourth embodiments being more compact to make upper limit of condition (1) 0.42. By means of making the scope of condition (1) narrower such that the upper limit is made to be 0.42 and the lower limit is made to be 0.32, it can be possible to make it to be both compact and high quality.

In the present first through fourth embodiments, in order to shorten the total lens length, a part of positive refractive power of the second lens group is shifted to the first lens group. Therefore, it is desirable to satisfy the following condition (2).

$$0.4<f2/(fw \cdot ft)^{1/2}<0.8 \qquad (2)$$

Where f2 denotes the focal length of the second lens group, fw denotes the focal length of the whole lens system in the wide-angle end state, and ft denotes the focal length of the whole lens system in the telephoto end state.

Condition (2) defines an appropriate range of the focal length f2 of the second lens group.

When $f2/(fw \cdot ft)^{1/2}$ exceeds the upper limit of condition (2), in order to maintain a predetermined zoom ratio, the space (air gap) between the second lens group and the third lens group in the wide-angle end state becomes wider(i.e. larger) and, therefore, off-axis light flux passing through the third lens group passes away from the optical axis. As a result, the diameter of the zoom lens becomes larger. This is undesirable.

On the other hand, when $f2/(fw \cdot ft)^{1/2}$ falls below the lower limit of condition (2), a convergence effect provided by the first lens group becomes weaker and, therefore, the total lens length in the telephoto end state cannot be shortened enough. This is undesirable.

Further, in order to correct on-axis aberration produced by the second lens group alone excellently and to provide high quality lens system, it is desirable to make upper limit of condition (2) 0.7.

The present first through fourth embodiments have such a construction as described before that the third lens group magnifies an intermediate image of an object formed by the first lens group and the second lens group and, then, forms an image.

The zoom lens system can be easily made compact by means of making larger the lateral magnification (rate of enlargement) of the third lens group. However, the variation of the image plane with respect to the fluctuation of each lens group along to the optical axis in the telephoto end state becomes seriously large. So, in order to make the variation of a position at the image plane smaller, it is important to make the lateral magnification of the third lens group as much smaller as possible. When the variation of the position of the image plane becomes large, the accuracy to be required to stop each lens group becomes very high. As a result, the control of the lens position must be done ultra slowly. Therefore, it makes user uncomfortable. This is undesirable.

Since the lateral magnification of the third lens group in the telephoto end state is larger than that in the wide-angle end state, it is desirable to make the lateral magnification in the telephoto end state smaller. However, when the lateral magnification in the wide-angle end state becomes smaller, the off-axis light flux passing through the third lens group passes away from the optical axis and, therefore, the diameter of the zoom lens system becomes larger. Therefore, it is important to make the variation of the lateral magnification of the third lens group according to the change of the state from the wide-angle end state to the telephoto end state smaller. It is also important to make a big change in the space(air gap) between the first lens group and the second lens group while changing the state of the focal length. Therefore, it is desirable to satisfy following condition (3);

$$0.15 < \Delta 1/f1 < 0.3 \tag{3}$$

Where $\Delta 1$ represents a variation of the space(air gap) along to the optical axis between the first lens group and the second lens group relative to the change of the state from the wide-angle end state to the telephoto end state. And f1 represents the focal length of the first lens group.

Condition (3) defines an appropriate range of a variation $\Delta 1$ of the space(air gap) along to the optical axis between the first lens group and the second lens group.

When $\Delta 1/f1$ exceeds the upper limit of condition (3), the off-axis light flux passing through the first lens group passes away from the optical axis in the telephoto end state and, therefore, the diameter of the lens system becomes larger. This is undesirable.

On the other hand, when $\Delta 1/f1$ falls below the lower limit of condition (3), the variation of the lateral magnification of the third lens group relative to the change of the state from the wide-angle end state to the telephoto end state becomes larger. This is undesirable.

In order to correct on-axis aberration produced by the second lens group alone excellently and to make the total lens length shorter, the third lens group is further comprising a positive lens element and a negative lens element arranged to the image side of said positive lens element. And it is desirable to satisfy following condition (4);

$$1.4 < f1/|f3| < 2.8 \tag{4}$$

Where f1 represents the focal length of the first lens group and f3 represents the focal length of the third lens group.

Condition (4) defines an appropriate range of a ratio of the focal length f1 of the first lens group to that f3 of the third lens group.

When this ratio exceeds the upper limit of condition (4), the total lens length in the telephoto end state becomes larger. Therefore, this is undesirable for the purpose of the present invention as to be compact.

On the other hand, when this ratio falls below the lower limit of condition (4), the off-axis light flux passing through the first and third lens group passes away from the optical axis in the wide-angle end state and, therefore, the diameter of the lens system becomes larger. This is undesirable. Furthermore, coma produced in the periphery of the image cannot be corrected well. This is also undesirable.

Since the first lens group has a strong positive refractive power, it is liable to produce negative spherical aberration. In the present first through fourth embodiments, in order to correct negative spherical aberration produced by the first lens group excellently and to provide a high quality lens system with small number of lens element, it is desirable that the first lens group has a cemented positive lens comprising a double convex lens and a negative meniscus lens facing a concave surface to the object.

For example, according to a zoom lens configuration disclosed in Japanese Patent Laid-Open Publication No. 3-282409, a first lens group has a cemented lens comprising a negative meniscus lens facing a convex surface to the object side and a double convex lens. When convergence of the first lens group is made stronger, a negative spherical aberration is produced in large quantity. Therefore, this is not suitable for shortening of the total lens length.

In the present first through fourth embodiments, in order to correct coma produced in the wide-angle end state and to provide high quality lens system, it is desirable to satisfy following condition (5);

$$3 < |Ra|/Da < 6 \tag{5}$$

Where Ra represents a radius of curvature of the cemented surface of the composite positive lens in the first lens group. Da represents the distance along the optical axis between the cemented surface of the composite positive lens in the first lens group and an aperture diaphragm in the second lens group in the wide-angle end state.

When the ratio exceeds the upper limit of condition (5), a high-order spherical aberration produced at the cemented surface of the composite positive lens becomes smaller and, therefore, a negative spherical aberration produced by the first lens group alone cannot be corrected well. So high quality lens system cannot be expected. This is undesirable.

On the other hand, when the ratio falls below the lower limit of condition (5), coma produced in the wide-angle end state becomes larger and good optical quality cannot be obtained in the periphery of the image. This is undesirable.

In the present first through fourth embodiments, it is desirable as described before that the second lens group is comprised of a negative sub lens group and a positive sub lens group arranged to the image side of said negative sub lens group. However, when both refractive power of the negative sub lens group and that of the positive sub lens group become stronger, off-axis light flux passing through the negative sub lens group and the positive sub lens group are refracted stronger in the wide-angle end state. Therefore, a large quantity of coma is produced in the periphery of the image. In order to improve optical quality in the present first through fourth embodiments, it is desirable to constitute the second lens group to satisfy following condition (6);

$$0.6 < (|f2a|+f2b)/f2 < 1.8 \quad (6).$$

Where f2a represents a focal length of the negative sub lens group in the second lens group and f2b represents a focal length of the positive sub lens group in the second lens group and f2 represents the focal length of the second lens group.

When the value $(|f2a|+f2b)/f2$ exceeds the upper limit of condition (6), the back focal length in the wide-angle end state becomes shorter and off-axis light flux passing through the third lens group passes away from the optical axis. As a result, the diameter of the lens system becomes larger. This is undesirable.

On the other hand, when the value $(|f2a|+f2b)/f2$ falls below the lower limit of condition (6), a large quantity of coma is produced in the periphery of the image as described before. This is undesirable.

(first embodiment)

Figure 2:
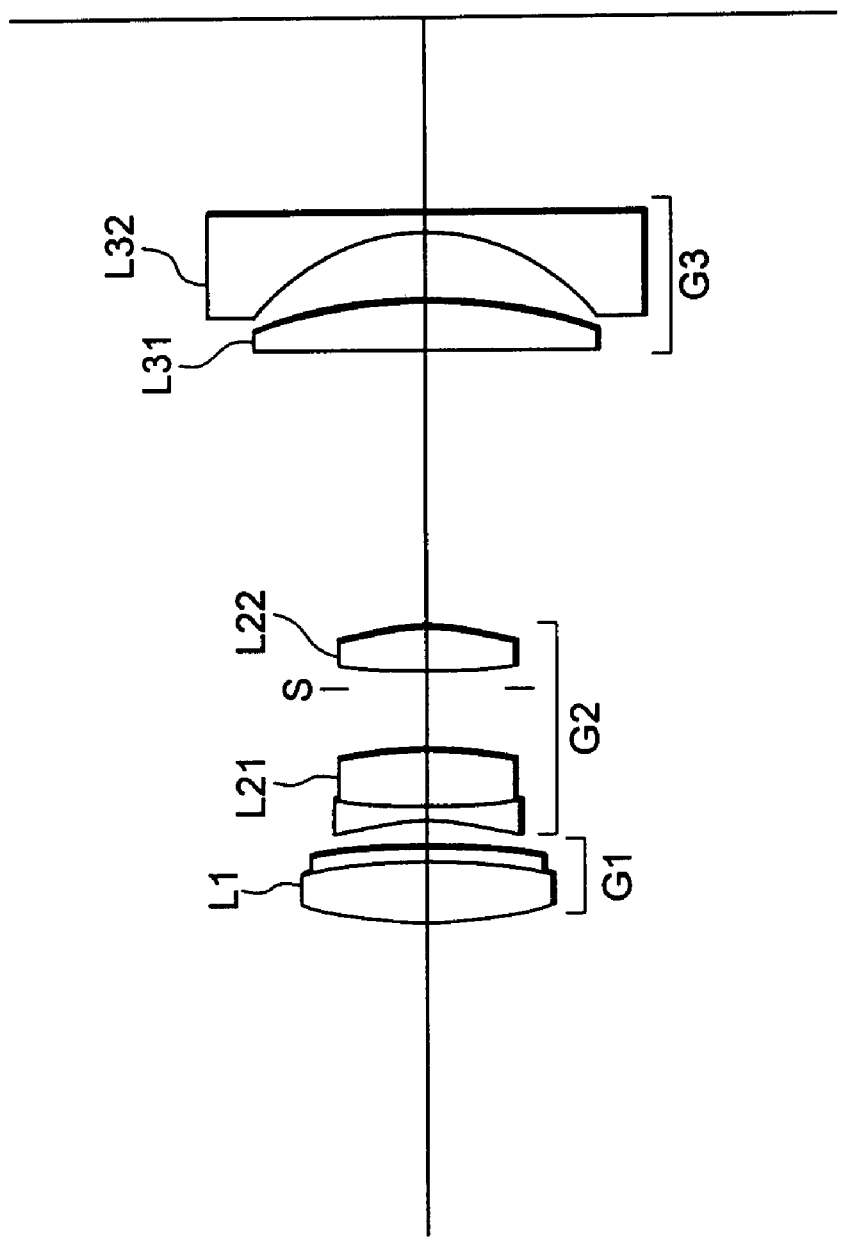
FIG. 2 is a view schematically showing the configuration of the variable focal length optical system according to a first embodiment of the present invention.
Figures 3A, 3B, 3C, 3D:
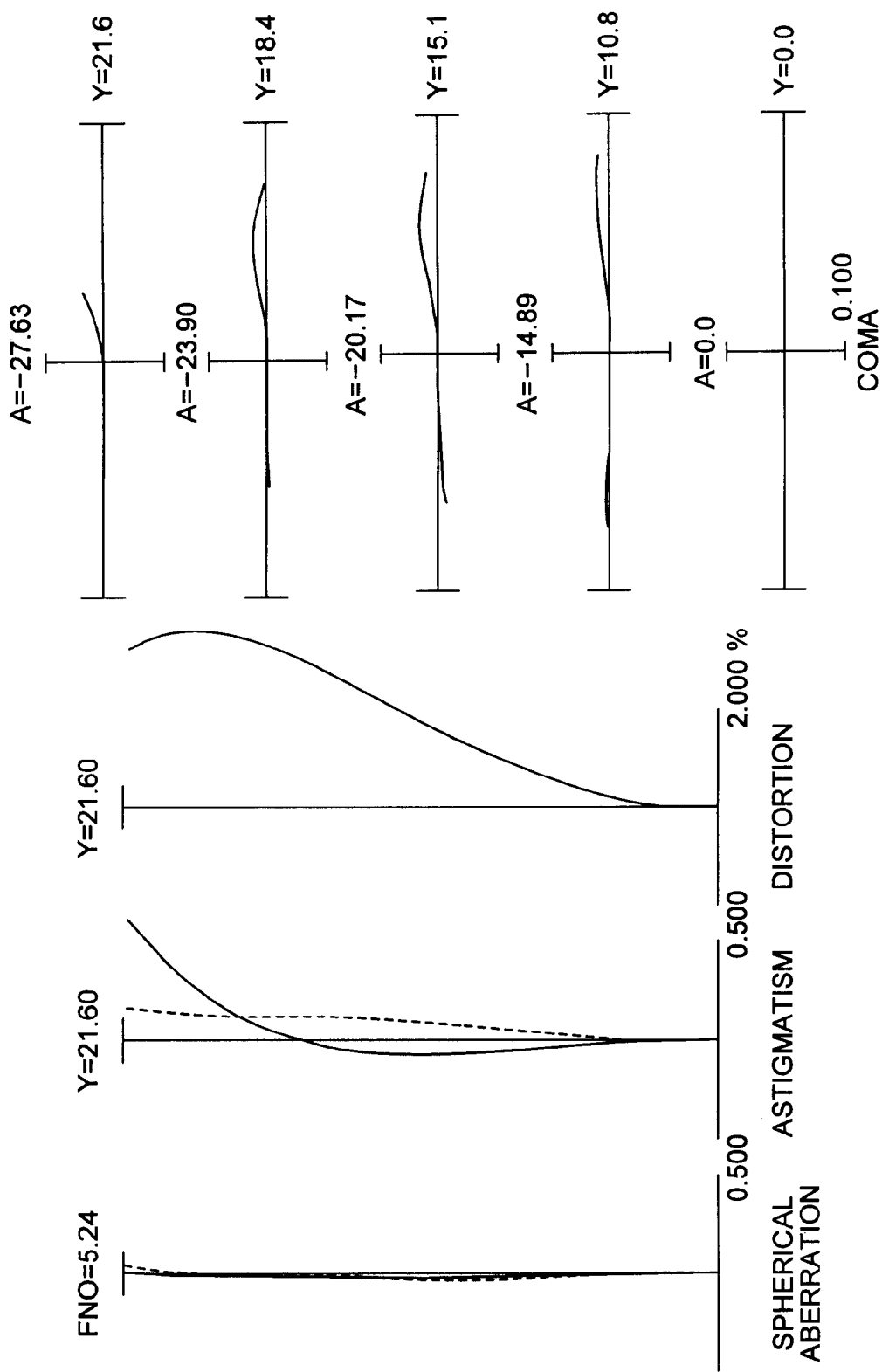
FIGS. 3A to 3D are graphs showing various aberrations in the wide-angle end state when the optical system is focused at infinity.
Figures 4A, 4B, 4C, 4D:
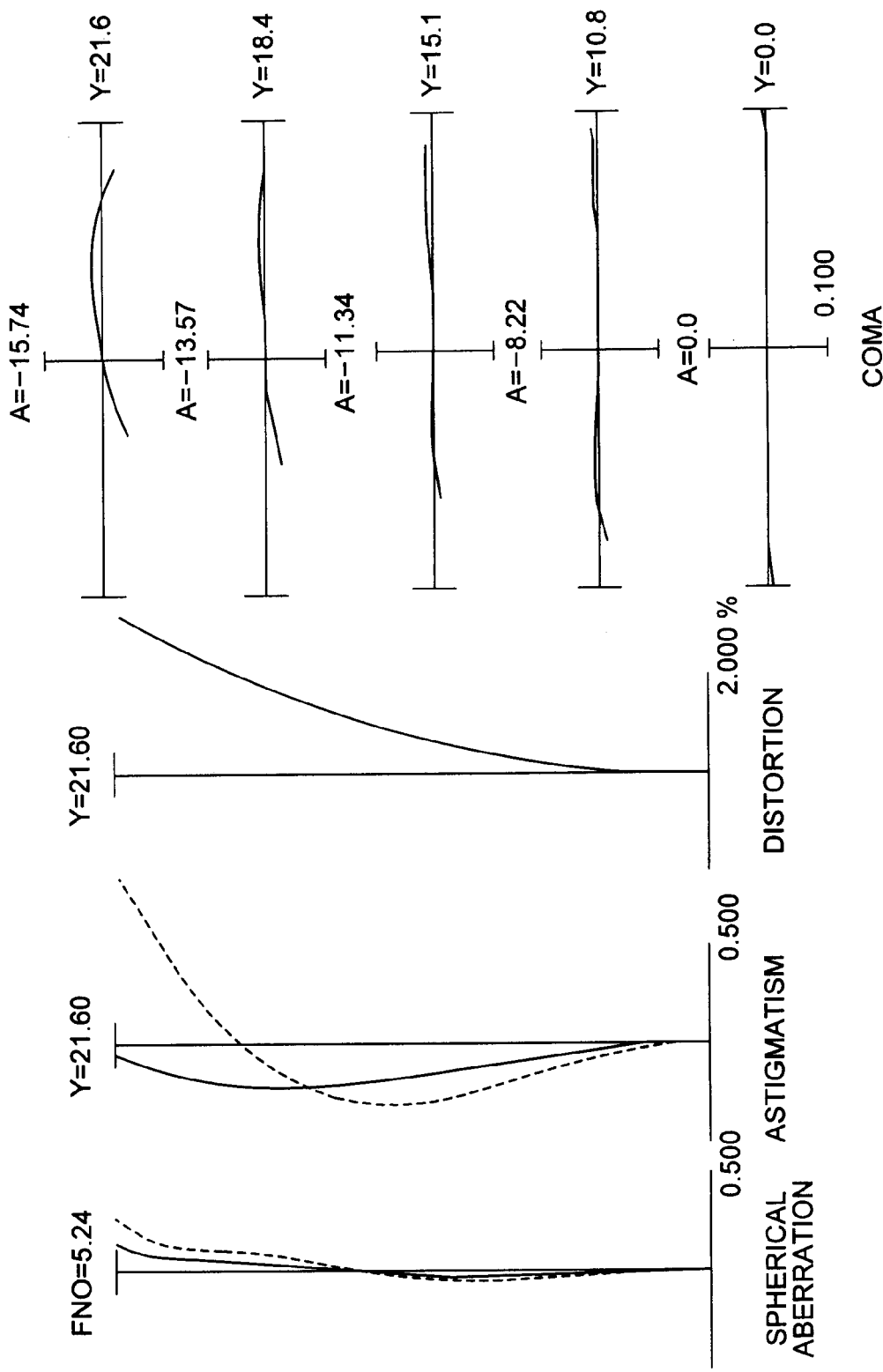
FIGS. 4A to 4D are graphs showing various aberrations in the first intermediate focal length state when the optical system is focused at infinity.
Figures 5A, 5B, 5C, 5D:
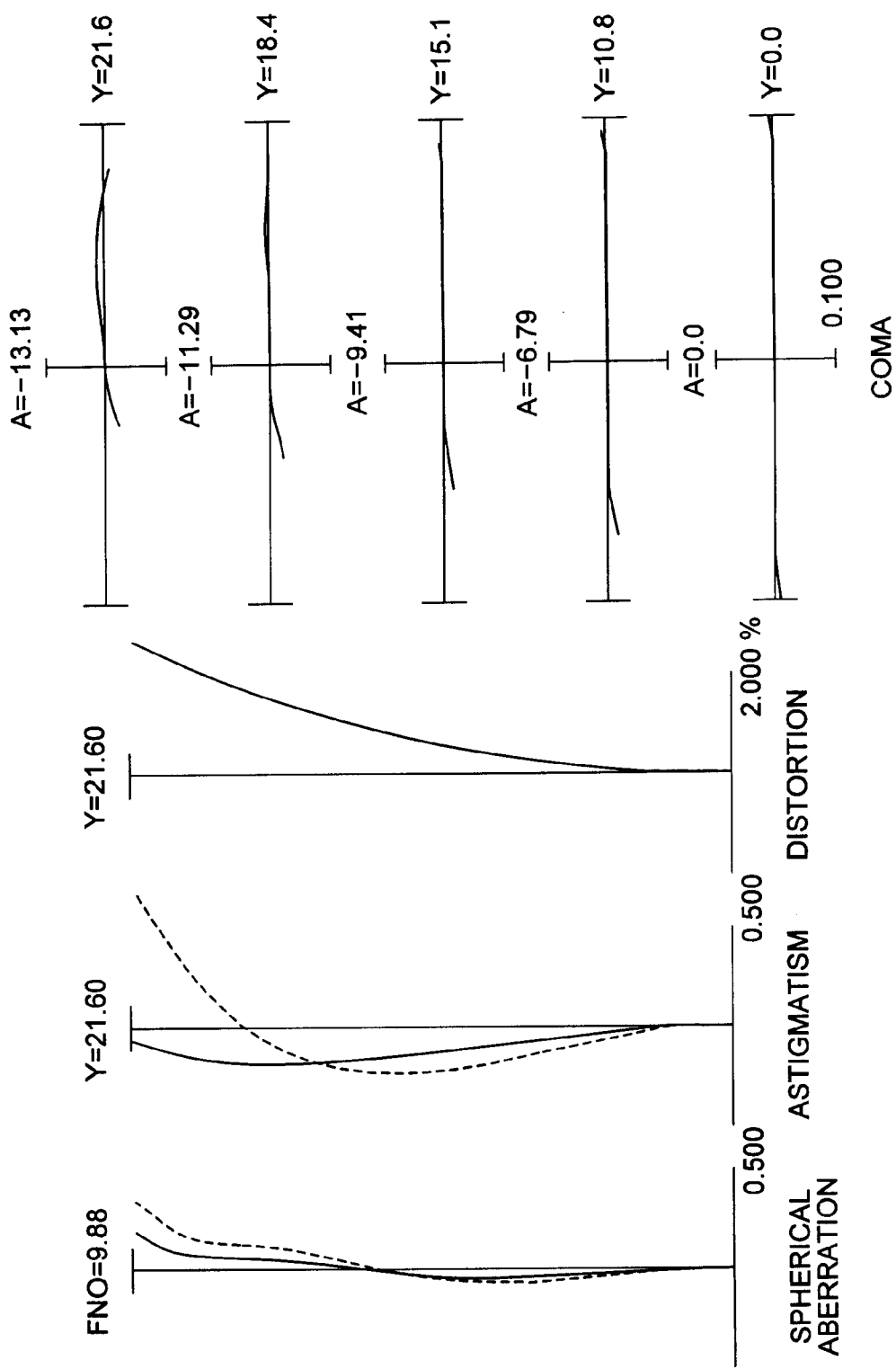
FIGS. 5A to 5D are graphs showing various aberrations in the second intermediate focal length state when the optical system is focused at infinity.
Figures 6A, 6B, 6C, 6D:
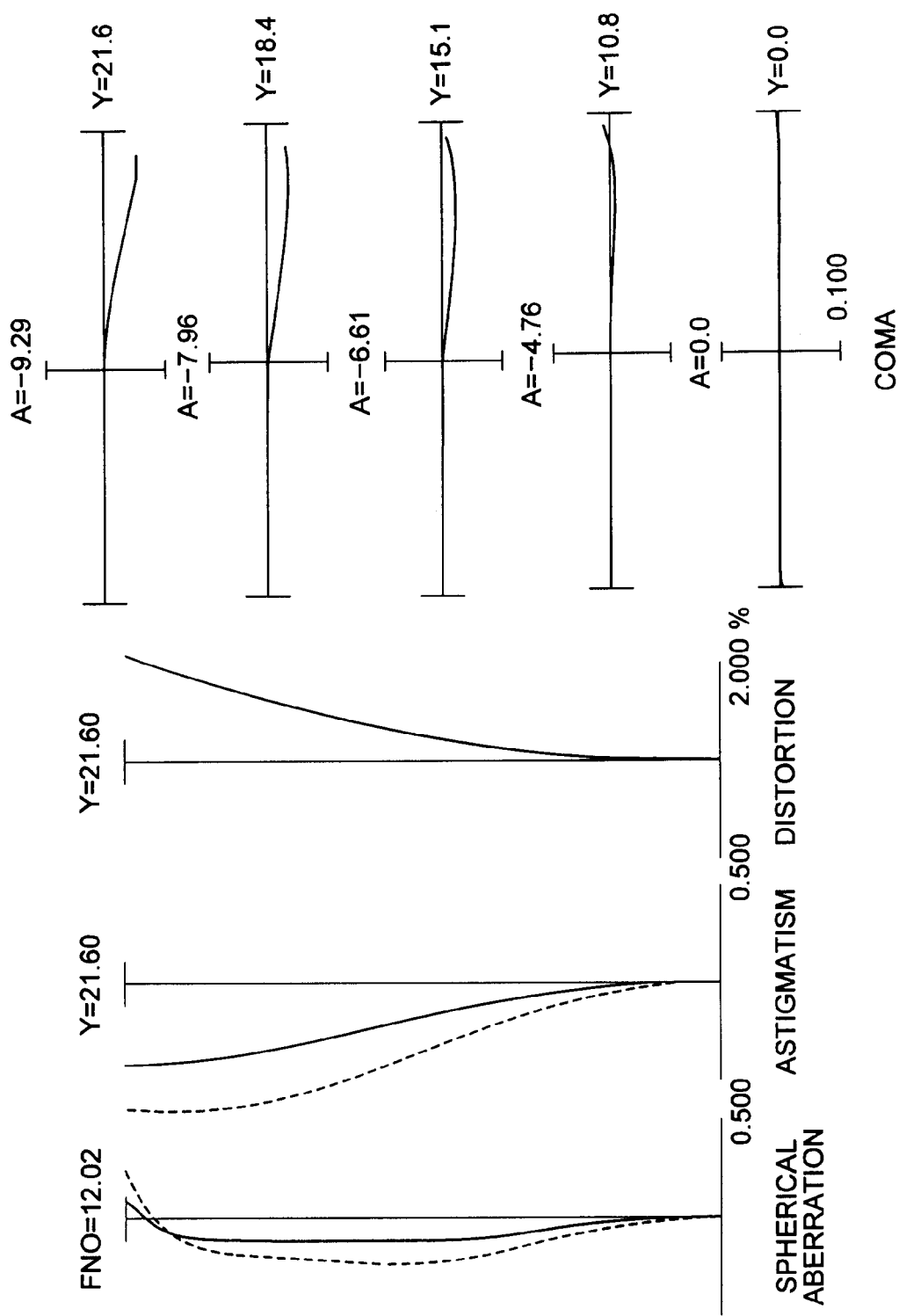
FIGS. 6A to 6D are graphs showing various aberrations in the telephoto end state when the optical system is focused at infinity.

FIG. 2 is a view schematically showing the configuration of the variable magnification optical system according to the first embodiment of the present invention.

In the variable magnification optical system shown in FIG. 2, the first lens group G1 has a compound positive lens L1 comprising, in order from the object side, a double convex lens and a negative meniscus lens facing a concave surface to the object side.

The second lens group G2 is composed of, in order from the object side, a composite negative lens L21, composed of a double-concave lens element and a double convex lens element, and a double-convex lens L22 with both, object side and image side, surfaces made to be aspherical surfaces.

The third lens group G3 is composed of, in order from the object side, a positive meniscus lens L31 with both, object side and image side, surfaces made to be aspherical surfaces facing a concave surface to the object side, and a negative meniscus lens L32 facing a concave surface to the object side.

An aperture diaphragm S is disposed in the second lens group G2 between the composite negative lens L21 and the double-convex lens L22, and moves integrally with the second lens group when the state of lens group positions is changed from the wide-angle end state to the telephoto end state.

As described above, in the second lens group G2 of the first embodiment, the negative sub lens group is composed of the composite negative lens L21 and the positive sub lens group is composed of the double-convex lens L22.

Various values associated with first embodiment are listed in Table 1. In Table 1, f denotes, in mm, the focal length, FNO denotes the f-number, 2ω denotes an angle of view, and Bf denotes, in mm, the back focal length. The surface number indicates the order of the lens surface along a direction which light rays travel from the object. In addition, values indicated as the refractive index and Abbe number are values for the d-line (λ=587.6 nm).

TABLE 1

| f = | 39.90 | 74.12 | 89.99 | 129.01 |
|---|---|---|---|---|
| FNO = | 5.23 | 8.63 | 9.84 | 12.00 |
| 2ω = | 55.26° | 31.47° | 26.26° | 18.57° |

| surface number | radius of curvature | interval between the surfaces | refractive index | Abbe constant | |
|---|---|---|---|---|---|
| 1 | 26.4241 | 3.20 | 1.49700 | 81.61 | G1 |
| 2 | −41.4416 | 0.80 | 1.69895 | 30.05 | |
| 3 | −90.9209 | D3 variable | | | |
| 4 | −16.1776 | 0.80 | 1.83481 | 42.72 | G2 |
| 5 | 37.1694 | 3.00 | 1.59551 | 39.23 | |
| 6 | −30.1045 | 3.25 | | | |
| 7 | ∞ | 1.00 | Aperture diaphragm S | | |
| 8* | 35.0282 | 2.10 | 1.51450 | 63.05 | |
| 9* | −16.2556 | D9 variable | | | |
| 10* | −202.7946 | 2.40 | 1.68893 | 31.16 | G3 |
| 11* | −33.8494 | 3.85 | | | |
| 12 | −11.4234 | 1.00 | 1.80400 | 46.58 | |
| 13 | −187.8519 | (Bf) | | | |

Data for the aspherical surfaces

| | surface number | | | |
|---|---|---|---|---|
| | 8 | 9 | 10 | 11 |
| R | 35.0282 | −16.2556 | −202.7946 | −33.8494 |
| κ | 6.6429 | −1.2589 | −9.0000 | 0.6596 |
| $C_4$ | $+4.3684 \times 10^{-5}$ | $+3.5316 \times 10^{-5}$ | $+3.2681 \times 10^{-5}$ | $-2.8972 \times 10^{-5}$ |
| $C_6$ | $+3.8891 \times 10^{-6}$ | $+4.7201 \times 10^{-6}$ | $+1.1056 \times 10^{-6}$ | $+1.2400 \times 10^{-6}$ |
| $C_8$ | $-1.4583 \times 10^{-7}$ | $-1.9727 \times 10^{-7}$ | $-1.9727 \times 10^{-7}$ | $-2.5194 \times 10^{-7}$ |
| $C_{10}$ | $+5.0827 \times 10^{-9}$ | $+6.3548 \times 10^{-9}$ | $+1.2038 \times 10^{-9}$ | $+9.8036 \times 10^{-9}$ |

Variable interval during zooming

| f | 39.9011 | 74.1201 | 89.9870 | 129.0071 |
|---|---|---|---|---|
| D3 | 1.3000 | 5.5244 | 7.5843 | 12.2785 |
| D9 | 15.4437 | 7.2327 | 5.0473 | 1.0000 |
| Bf | 10.4618 | 34.2273 | 43.9949 | 65.3252 |

Values for the above conditions f1 = 46.5838
f2 = 40.9020
f3 = −22.2663
f2a = −27.9368
f2b = 21.8846
(1) f1/ft = 0.361
(2) f2/(fw · ft)½ = 0.570
(3) Δ1/f1 = 0.236
(4) f1/|f3| = 2.092
(5) |Ra|/Da = 4.529
(6) (|f2a| + f2b)/f2 = 1.218

FIGS. 3 through 6 show various aberrations for the d-line (λ=587.6 nm) associated with first embodiment.

FIGS. 3A–3D show the various aberrations when the optical system is set in the wide-angle end state (f=39.90) focused on an infinite object. FIGS. 4A–4D show the various aberrations when the optical system is in the first intermediate focal length state (f=74.12) focused on the infinite object. FIGS. 5A–5D show the various aberrations when the optical system is in the second intermediate focal length state (f=89.99) focused on the infinite object. FIGS. 6A–6D show the various aberrations when the optical system is in the telephoto end state (f=129.01) focused on the infinite object.

In the respective diagrams, FNO denotes the F-number, Y denotes, in mm, an image height, A denotes, in degrees, a half angle of view for the respective image height. In the diagrams showing astigmatism, a solid line indicates a sagittal image plane and a broken line indicates a meridional image plane. In the diagrams showing spherical aberrations, a solid line indicates spherical aberration and a broken line indicates the sine condition.

As is apparent from the respective diagrams showing the various aberrations, excellent compensation is made for the various aberrations at the respective image distance and at the respective focal lengths.

(second embodiment)

Various values associated with second embodiment are listed in Table 2. In Table 2, f denotes, in mm, the focal length, FNO denotes the f-number, $2\omega$ denotes an angle of view, and Bf denotes, in mm, the back focal length.

The surface number indicates the order of the lens surface along a direction which light rays travel from the object. In addition, values indicated as the refractive index and Abbe number are values for the d-line ($\lambda$=587.6 nm).

TABLE 2

| f   | = | 39.90   | 68.30  | 81.63  | 114.00  |
|-----|---|---------|--------|--------|---------|
| FNO | = | 5.77    | 8.83   | 9.94   | 12.00   |
| $2\omega$ | = | 55.25° | 34.00° | 28.81° | 20.94° |

| surface number | radius of curvature | interval between the surfaces | refractive index | Abbe constant | |
|---|---|---|---|---|---|
| 1  | 21.9665  | 2.80        | 1.49700 | 81.61 | G1 |
| 2  | -39.0600 | 0.80        | 1.72825 | 28.46 |    |
| 3  | -88.2420 | D3 variable |         |       |    |
| 4  | -15.9690 | 0.80        | 1.80400 | 46.59 | G2 |
| 5  | 40.0900  | 1.70        | 1.62004 | 36.26 |    |
| 6  | -87.7678 | 2.80        |         |       |    |
| 7  | ∞        | 1.00        | Aperture diaphragm S | | |
| 8  | 28.5112  | 2.00        | 1.51450 | 63.05 |    |
| 9* | -13.4581 | D9 variable |         |       |    |
| 10*| -53.0174 | 2.10        | 1.68893 | 31.16 | G3 |
| 11*| -27.1267 | 4.10        |         |       |    |
| 12 | -9.8404  | 1.00        | 1.77250 | 49.61 |    |
| 13 | -54.2614 | (Bf)        |         |       |    |

Data for the aspherical surfaces

| | surface number | | |
|---|---|---|---|
|       | 8                        | 9                        | 10                       |
| R     | -13.4581                 | -53.0174                 | -27.1267                 |
| κ     | -0.1752                  | 0.3695                   | 8.3423                   |
| $C_4$ | +2.2259 × 10$^{-5}$      | +5.4725 × 10$^{-5}$      | 2.4363 × 10$^{-5}$       |
| $C_6$ | +8.0907 × 10$^{-7}$      | +1.6955 × 10$^{-6}$      | +2.1095 × 10$^{-6}$      |
| $C_8$ | -3.1970 × 10$^{-8}$      | -4.2466 × 10$^{-8}$      | -4.2466 × 10$^{-8}$      |
| $C_{10}$ | +1.3268 × 10$^{-10}$  | +1.8950 × 10$^{-10}$     | +1.8050 × 10$^{-10}$     |

Variable interval during zooming

| f  | 39.9000 | 68.2967 | 81.6349 | 114.0000 |
|----|---------|---------|---------|----------|
| D3 | 1.3000  | 4.7499  | 6.4316  | 10.2648  |
| D9 | 13.1199 | 6.5599  | 4.6290  | 1.0000   |
| Bf | 11.3232 | 31.0338 | 39.3749 | 57.6155  |

Values for the above conditions f1 = 40.3318
f2 = 40.3926
f3 = -20.5714
f2a = -21.0933
f2b = 18.0622
(1) f1/ft = 0.354
(2) f2/(fw · ft)$^{1/2}$ = 0.599
(3) Δ1/f1 = 0.222
(4) f1/|f3| = 1.961
(5) |Ra|/Da = 5.278
(6) (|f2a| + f2b)/f2 = 0.969

(third embodiment)

Various values associated with third embodiment are listed in Table 3. In Table 3, f denotes, in mm, the focal length, FNO denotes the f-number, $2\omega$ denotes an angle of view, and Bf denotes, in mm, the back focal length. The surface number indicates the order of the lens surface along a direction which light rays travel from the object. In addition, values indicated as the refractive index and Abbe number are values for the d-line ($\lambda$=587.6 nm).

TABLE 3

| f   | = | 39.90   | 68.32  | 81.66  | 114.00  |
|-----|---|---------|--------|--------|---------|
| FNO | = | 5.57    | 8.63   | 9.79   | 12.01   |
| $2\omega$ | = | 55.23° | 33.90° | 28.75° | 20.94° |

| surface number | radius of curvature | interval between the surfaces | refractive index | Abbe constant | |
|---|---|---|---|---|---|
| 1  | 24.6382   | 2.70        | 1.49700 | 81.61 | G1 |
| 2  | -42.2000  | 0.80        | 1.74077 | 27.76 |    |
| 3  | -97.4668  | D3 variable |         |       |    |
| 4  | -14.9901  | 0.80        | 1.80420 | 46.51 | G2 |
| 5  | -111.2820 | 2.00        | 1.69895 | 30.05 |    |
| 6  | -50.5754  | 2.60        |         |       |    |
| 7  | ∞         | 1.00        | Aperture diaphragm S | | |
| 8  | 36.8153   | 1.95        | 1.51450 | 63.05 |    |
| 9  | -13.7793  | D9 variable |         |       |    |
| 10*| -226.0555 | 2.55        | 1.58518 | 30.24 | G3 |
| 11 | -33.9560  | 3.90        |         |       |    |
| 12 | -9.4514   | 1.00        | 1.80420 | 46.51 |    |
| 13 | -49.3729  | (Bf)        |         |       |    |

Data for the aspherical surfaces

| | surface number | |
|---|---|---|
|       | 9                        | 10                       |
| R     | -13.7793                 | -226.0555                |
| κ     | -1.2267                  | -9.0000                  |
| $C_4$ | -3.5033 × 10$^{-5}$      | +1.0203 × 10$^{-4}$      |
| $C_6$ | +1.2629 × 10$^{-6}$      | +2.2804 × 10$^{-7}$      |
| $C_8$ | -8.0470 × 10$^{-8}$      | +7.2312 × 10$^{-9}$      |
| $C_{10}$ | +2.1608 × 10$^{-9}$   | +1.5148 × 10$^{-11}$     |

Variable interval during zooming

| f  | 39.9000 | 68.3242 | 81.6616 | 114.0000 |
|----|---------|---------|---------|----------|
| D3 | 1.3000  | 5.0302  | 6.8484  | 10.9930  |
| D9 | 12.5706 | 6.3589  | 4.5790  | 1.3000   |
| Bf | 11.3290 | 31.5499 | 38.6710 | 56.4039  |

Values for the above conditions f1 = 45.7075
f2 = 38.4733
f3 = -20.0696
f2a = -26.5429
f2b = 19.7465
(1) f1/ft = 0.401
(2) f2/(fw · ft)$^{1/2}$ = 0.570
(3) Δ1/f1 = 0.212
(4) f1/|f3| = 2.277
(5) |Ra|/Da = 5.627
(6) (|f2a| + f2b)/f2 = 1.203

(fourth embodiment)

Various values associated with fourth embodiment are listed in Table 4. In Table 4, f denotes, in mm, the focal length, FNO denotes the f-number, $2\omega$ denotes an angle of view, and Bf denotes, in mm, the back focal length. The surface number indicates the order of the lens surface along a direction which light rays travel from the object. In addition, values indicated as the refractive index and Abbe number are values for the d-line ($\lambda$=587.6 nm).

TABLE 4

| f | = | 39.90 | 78.73 | 96.91 | 142.50 |
|---|---|---|---|---|---|
| FNO | = | 5.90 | 9.34 | 10.30 | 12.01 |
| 2ω | = | 55.30° | 29.99° | 24.50° | 18.88° |

| surface number | radius of curvature | interval between the surfaces | refractive index | Abbe constant | |
|---|---|---|---|---|---|
| 1 | 32.8698 | 3.10 | 1.49700 | 81.61 | G1 |
| 2 | −40.0414 | 0.80 | 1.64769 | 33.84 | |
| 3 | −93.7341 | D3 variable | | | |
| 4 | −17.0426 | 0.80 | 1.83481 | 42.72 | G2 |
| 5 | 92.8430 | 3.00 | 1.56732 | 42.85 | |
| 6 | −25.6159 | 5.00 | | | |
| 7 | ∞ | 1.00 | Aperture diaphragm S | | |
| 8* | 38.6993 | 2.15 | 1.51450 | 63.05 | |
| 9* | −18.4256 | D9 variable | | | |
| 10* | 1263.7879 | 2.50 | 1.68893 | 31.16 | G3 |
| 11* | −38.0314 | 4.00 | | | |
| 12 | −11.8899 | 1.00 | 1.81550 | 44.54 | |
| 13 | −1902.7573 | (Bf) | | | |

Data for the aspherical surfaces

| | surface number | | | |
|---|---|---|---|---|
| | 8 | 9 | 10 | 11 |
| R | 38.6993 | −18.4256 | 1263.7879 | −38.0314 |
| κ | 2.5351 | −0.0338 | 11.0000 | 1.1282 |
| $C_4$ | $+3.3673 \times 10^{-5}$ | $+4.9416 \times 10^{-5}$ | $+1.9481 \times 10^{-5}$ | $-3.8424 \times 10^{-5}$ |
| $C_6$ | $+1.2901 \times 10^{-6}$ | $+1.8617 \times 10^{-6}$ | $+1.1381 \times 10^{-6}$ | $+1.2406 \times 10^{-6}$ |
| $C_8$ | $-4.2454 \times 10^{-8}$ | $-7.7015 \times 10^{-8}$ | $-2.1373 \times 10^{-8}$ | $-2.3479 \times 10^{-8}$ |
| $C_{10}$ | $+8.5829 \times 10^{-10}$ | $+1.5279 \times 10^{-9}$ | $+1.0299 \times 10^{-10}$ | $+8.1913 \times 10^{-11}$ |

Variable interval during zooming

| f | 39.9000 | 78.7326 | 96.9062 | 142.5033 |
|---|---|---|---|---|
| D3 | 1.3000 | 6.5074 | 9.0458 | 14.8317 |
| D9 | 15.7443 | 6.9569 | 2.8448 | 0.8000 |
| Bf | 10.2586 | 36.6780 | 47.4504 | 71.0200 |

Values for the above conditions f1 = 55.1580
f2 = 38.1804
f3 = −22.5403
f2a = −36.8937
f2b = 24.5755
(1) f1/ft = 0.387
(2) f2/(fw · ft)½ = 0.506
(3) Δ1/f1 = 0.245
(4) f1/|f3| = 2.447
(5) |Ra|/Da = 3.674
(6) (|f2a| + f2b)/f2 = 1.610

(Fifth through Seventh Embodiments)

In the fifth through seventh embodiments of the present invention, the condition (7) is satisfied;

$$1.10 < f12T/f12W < 1.50 \quad (7)$$

Where f12W denotes a composite focal length of the first lens group and the second lens group in the wide-angle end state and f12T denotes a composite focal length of the first lens group and the second lens group in the telephoto end state.

Condition (7) defines a variation of the lateral magnification of the second lens group. The value f1 denotes the focal length of the first lens group, β2W denotes a lateral magnification of the second lens group in the wide-angle end state, and β2T denotes a lateral magnification of the second lens group in the telephoto end state. Then, a composite focal length f12W of the first lens group and the second lens group in the wide-angle end state and a composite focal length f12T of the first lens group and the second lens group in the telephoto end state can be represented respectively;

$$f12W = f1 \cdot \beta 2W$$

$$f12T = f1 \cdot \beta 2T$$

Therefore, the variation β2T/β2W of the lateral magnification of the second lens group from the wide-angle end state to the telephoto end state can be expressed;

$$\beta 2T/\beta 2W = f12T/f12W.$$

Therefore, condition (7) defines the variation of the lateral magnification of the second lens group.

When the ratio exceeds the upper limit of condition (7), the space(air gap) between the first lens group and the second lens group becomes larger, and off-axis light flux passing through the first lens group passes away from the optical axis and, therefore, the first lens group becomes larger. On the other hand, when the ratio falls below the lower limit of condition (7), the variation of the lateral magnification of the second lens group from the wide-angle end state to the telephoto end state becomes smaller. This is contrary to an objective of the fifth through seventh embodiments to make the variation of the lateral magnification of the second lens group larger.

Moreover, in the fifth through seventh embodiments, it is desirable to satisfy condition (8). Where f2 denotes the focal length of the second lens group, and r2N denotes a radius of curvature of the surface located the most toward the object side of the negative sub lens group of the second lens group. And r2P denotes a radius of curvature of the surface located the most toward the image side of the positive sub lens group of the second lens group.

$$0.50 < (|r2N| + |r2P|)/f2 < 1.00 \quad (8)$$

Condition (8) defines the construction of the second lens group and the arrangement of the aperture diaphragm.

When, in the second lens group, the space(air gap) between the negative sub lens group having a negative refractive power and the positive sub lens group having a positive refractive power becomes larger, or when the thickness of the lens in the negative (or positive) sub lens group becomes larger, off-axis light flux passing through the second lens group passes away from the optical axis and, therefore, the diameter of the lens system becomes generally larger. On the other hand, when the space(air gap) between the negative sub lens group and the positive sub lens group becomes smaller, or when the thickness of the lens in the negative (or positive) sub lens group becomes smaller, the refractive power of the negative (or positive) sub lens group become stronger, and, as a result, the optical quality will be severely degraded by an eccentricity produced by a manufacturing process.

In the present fifth through seventh embodiments, in order to make the thickness of the lenses thinner and to make the space(air gap) between the principal points of the negative sub lens group and the positive lens group, which comprise the second lens group, larger, the most-object-side surface of the negative sub lens group located to the object side of the aperture diaphragm is set to be a concave surface facing to the object side. And the most-image-side surface of the positive sub lens group located to the image side of the aperture diaphragm is set to be a convex surface facing to the image side.

Condition (8) defines an appropriate range for suppressing the degradation of quality due to eccentricity, and the increase of mainly positive distortion in the wide-angle end state. Therefore, condition (8) defines an appropriate range of the radius of curvatures of the most-object-side surface of the negative sub lens group and the most-image-side surface of the positive sub lens group. When the ratio falls below the lower limit of condition (8), the radius of curvatures of the most-object-side surface of the negative sub lens group of the second lens group and the most-image-side surface of the positive sub lens group of the second lens group become smaller and, then, the refractive powers become larger. Therefore, the degradation of quality due to eccentricity becomes large, it becomes difficult to produce stably and, as a result, good product cannot be provided.

On the other hand, when the ratio exceeds the upper limit of condition (8), the radius of curvatures of the most-object-side surface of the negative sub lens group of the second lens group and the most-image-side surface of the positive sub lens group of the second lens group become larger and, then, the refractive powers become smaller. Therefore, the negative refractive power of the negative sub lens group of the second lens group located to the object side of the aperture diaphragm and the positive refractive power of the positive sub lens group of the second lens group located to the image side of the aperture diaphragm become both smaller and, as a result, the positive distortion mainly in the wide-angle end state becomes larger. In order to provide high quality optical system, It is preferable that the negative sub lens group is comprised of at least one negative lens element and at least one positive lens element, and that the positive sub lens group is comprised of at least one positive lens element and at least one negative lens element.

In the present fifth through seventh embodiments, moreover, it is preferable that the first lens group is comprised of a positive lens element and a negative lens element. In order to realize a high zoom ratio in a zoom lens system, it is important that an amount of aberration produced by each lens group is reduced in each lens group.

Since the first lens group has a strong positive refractive power, it is desirable to correct especially on-axis aberration well. So it is desirable that the first lens group is comprised of a positive lens element and a negative lens element. It is more preferable that the positive lens element and the negative lens element are made to be a composite lens in order to simplify the construction of the lens barrel.

In the present fifth through seventh embodiments, it is preferable to satisfy at least one of the following conditions;

$$nd1<1.50 \tag{9}$$

$$vvd1>75 \tag{10}$$

where nd1 denotes the refractive index of the positive lens element of the first lens group for the d-line ($\lambda$=587.6 nm), and vd1 denotes Abbe number of the positive lens element of the first lens group.

Condition (9) defines an appropriate range of the refractive index to prevent high-order coma in off-axis light flux. When nd1 exceeds the upper limit of condition (9), the difference of the refractive index between the refractive index of the positive lens element of the first lens group and the refractive index of the negative lens element of the first lens group becomes smaller. Therefore, in order to correct coma, the radius of curvature of the negative lens element becomes smaller and particularly high-order coma is produced and, as a result, the quality of the periphery of the image in the telephoto end state become worse.

Condition (10) defines an appropriate range of Abbe number to prevent high-order chromatic aberration in off-axis light flux. When v d1 falls below the lower limit of condition (10), the difference between Abbe number of the positive lens element of the first lens group and that of the negative lens element of the first lens group becomes smaller. Therefore, in order to correct chromatic aberration, the radius of curvature of the negative lens element becomes smaller and particularly high-order chromatic aberration is produced and, as a result, the quality of the periphery of the image in the telephoto end state becomes worse.

Although the same result can be obtained by means of constituting the first lens group of more than three lens elements (adding another positive lens element or negative lens element to the first lens group having a positive lens element) and a negative lens element, the thickness along to the optical axis becomes larger and, then, the diameter of the lens system becomes larger. Therefore, it is desirable to compose the first lens group of two lens elements, specifically a positive lens element and a negative lens element.

According to the present fifth through seventh embodiments, in order to reduce fluctuation of coma with respect to image angle and to reduce the diameter of the third lens group, it is desirable that the third lens group consists of a positive sub lens group having a positive refractive power and a negative sub lens group having a negative refractive power. And it is desirable to satisfy following condition (11);

$$2.5<f3P/|f3N|<5.0 \tag{11}$$

Where f3P denotes a focal length of the positive sub lens group of the third lens group, and f3N denotes a focal length of the negative sub lens group of the third lens group.

Condition (11) defines an appropriate range of the focal length of the positive sub lens group of the third lens group and that of the negative sub lens group of the third lens group. Condition (11) is for reducing fluctuation of coma with respect to image angle and for reducing the diameter of the third lens group.

When the ratio f3P/|f3N| falls below the lower limit of condition (11), the focal length of the positive sub lens group of the third lens group becomes smaller, and off-axis light flux passes through the third lens group closer to the optical axis. Therefore, the variation of coma with respect to image angle becomes larger. On the other hand, when the ratio exceeds the upper limit of condition (11), the focal length of the positive sub lens group of the third lens group becomes larger, and off-axis light flux passing through the third lens group passes away from the optical axis. Therefore, the diameter of the third lens group becomes lager.

(fifth embodiment)

Figure 7:
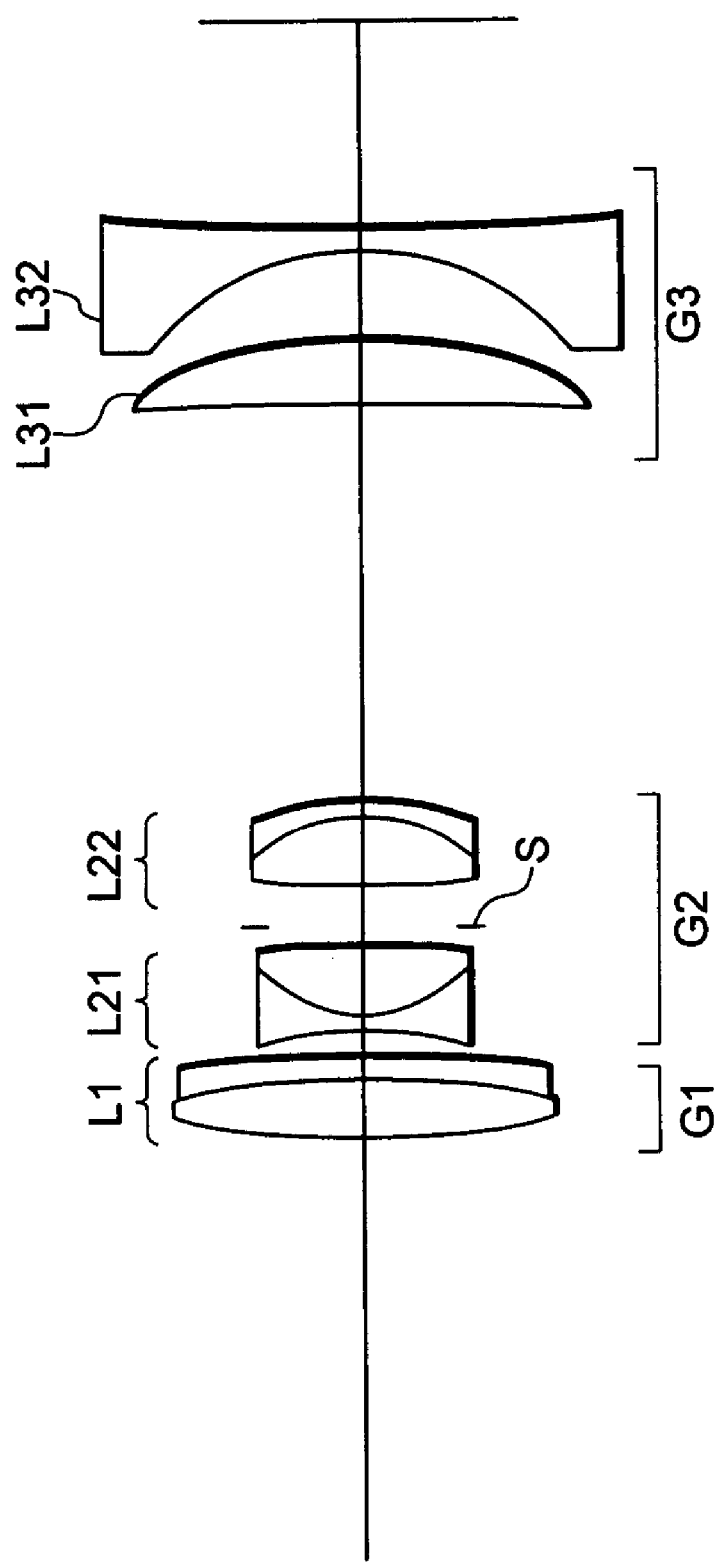
FIG. 7 is a view schematically showing the configuration of the variable magnification optical system according to the fifth embodiment of the present invention.
Figures 10A, 10B, 10C, 10D:
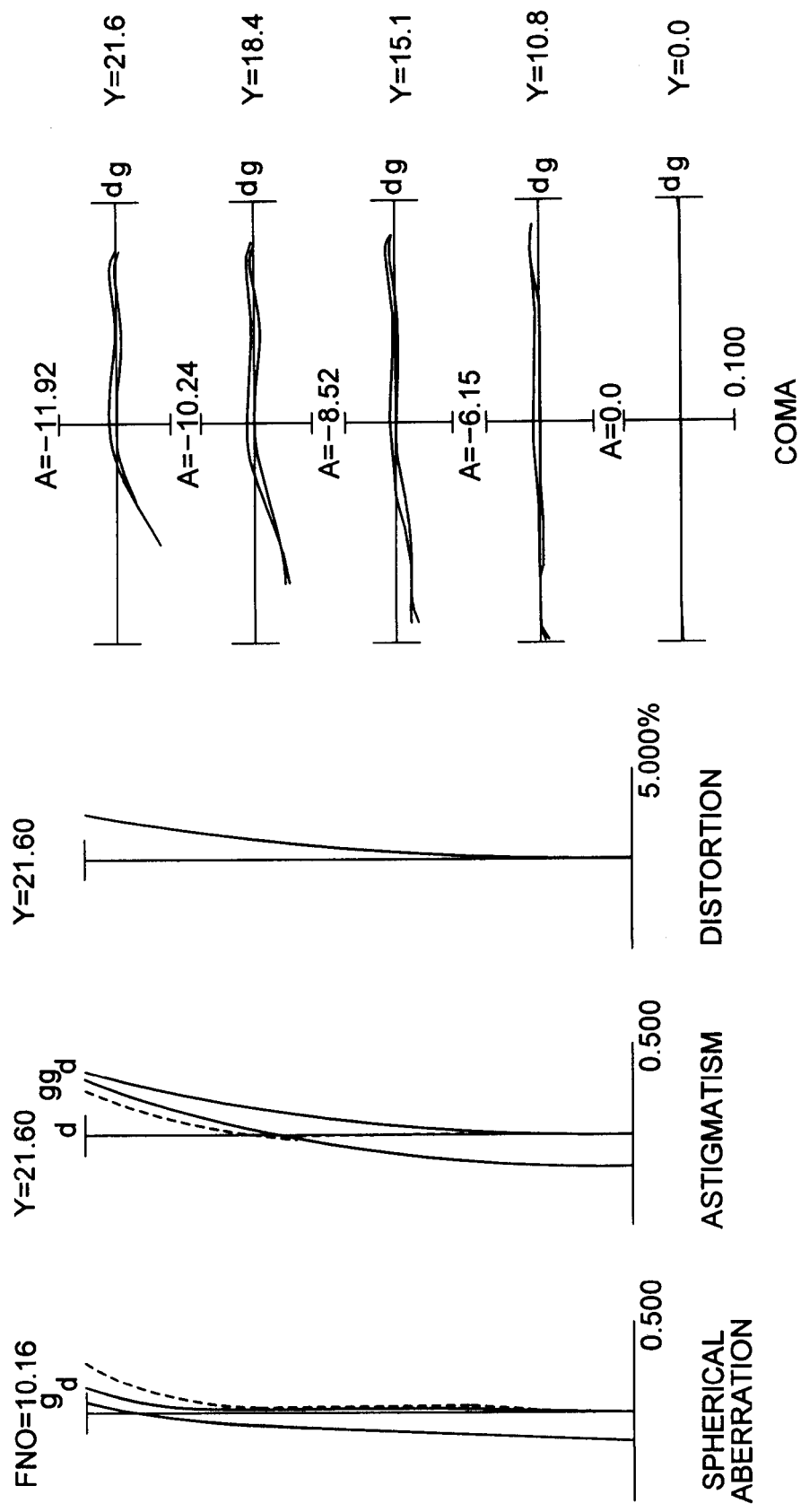
FIGS. 10A to 10D are graphs showing various aberrations in the second intermediate focal length state when the optical system is focused at infinity.

FIG. 7 illustrates the configuration of the variable magnification optical system according to fifth embodiment. The first lens group G1 has, in order from the object side, a composite positive lens L1 composed of a double convex lens element and a negative meniscus lens element facing a concave surface to the object side. The second lens group G2 is composed of a composite negative lens L21, composed of a double-concave lens element and a double-convex lens element, and a composite positive lens L22, composed of a double concave lens element and a negative meniscus lens element facing a concave surface to the object side. The third lens group G3 is composed of a positive lens element L31 facing a convex surface to the image side and a negative lens element L32 arranged to the image side of L31 with an air space(air gap) facing a concave surface to the object side.

In the present fifth through seventh embodiments, the negative composite lens L21 is a negative sub lens group, and the positive composite lens L22 is a positive sub lens group, and an aperture diaphragm S is located between them.

TABLE 5

| f | = | 39.90 | 61.74 | 99.64 | 151.99 |
|---|---|---|---|---|---|
| FNO | = | 5.10 | 7.32 | 10.13 | 12.48 |
| 2ω | = | 54.95° | 37.39° | 23.85° | 15.81° |

| surface number | radius of curvature | interval between the surfaces | refractive index | Abbe constant | |
|---|---|---|---|---|---|
| 1 | 43.1015 | 2.78 | 1.49700 | 81.61 | G1 |
| 2 | −39.8806 | 0.80 | 1.72825 | 28.31 | |
| 3 | −80.4363 | D3 variable | | | |
| 4 | −16.1258 | 0.80 | 1.83500 | 42.97 | G2 |
| 5 | 6.4644 | 3.20 | 1.80610 | 33.27 | |
| 6 | −90.0913 | 1.09 | | | |
| 7 | ∞ | 1.88 | Aperture diaphragm S | | |
| 8* | 44.8638 | 3.40 | 1.58313 | 59.44 | |
| 9 | −7.1402 | 0.80 | 1.72825 | 28.31 | |
| 10 | −11.7586 | D10 variable | | | |
| 11* | −395.9679 | 3.10 | 1.68893 | 31.16 | G3 |
| 12* | −31.9053 | 4.24 | | | |
| 13 | −12.7446 | 1.00 | 1.75500 | 52.32 | |
| 14 | 194.9241 | (Bf) | | | |

Data for the aspherical surfaces

| | surface number | | |
|---|---|---|---|
| | 8 | 11 | 12 |
| R | 44.8638 | −395.9679 | −31.9053 |
| κ | 4.8209 | 1.0000 | 1.0000 |
| $C_4$ | $-5.2420 \times 10^{-5}$ | $+2.5788 \times 10^{-5}$ | $-1.4070 \times 10^{-5}$ |
| $C_6$ | $+6.4023 \times 10^{-7}$ | $-6.4022 \times 10^{-7}$ | $-6.4022 \times 10^{-7}$ |
| $C_8$ | $-7.4883 \times 10^{-9}$ | $+1.1646 \times 10^{-8}$ | $+1.0731 \times 10^{-8}$ |
| $C_{10}$ | $+3.7296 \times 10^{-10}$ | $-1.0021 \times 10^{-10}$ | $-9.9156 \times 10^{-11}$ |

Variable interval during zooming

| f | 39.8988 | 61.7361 | 99.6372 | 151.9911 |
|---|---|---|---|---|
| D3 | 1.3000 | 5.6532 | 13.6738 | 22.9168 |
| D10 | 18.5443 | 11.5778 | 5.6813 | 0.8000 |
| Bf | 11.2822 | 28.1502 | 52.2898 | 78.1944 |

Values for the above conditions f1 = 68.0648
f2 = 37.3265
f3 = −26.2215
(7) f12T/f12W = 1.330
(8) (|r2N| + |r2P|)/f2 = 0.747
(9) nd1 = 1.497
(10) vd1 = 81.6
(11) f3P/|f3N| = 3.175

FIGS. 8 through 11 show the various aberrations when the optical system is set in the maximum wide-angle end state (f=39.90), in the first intermediate focal length state (f=61.74), in the second intermediate focal length state (f=99.64), and in the telephoto end state (f=151.99) focused on the infinite object respectively.

In the diagrams showing spherical aberrations, a solid line indicates spherical aberration and a broken line indicates the sine condition, Y denotes, in mm, an image height. In the diagrams showing astigmatism, a solid line indicates a sagittal image plane and a broken line indicates a meridional image plane, d indicates aberration relative to d-line, g indicates aberration relative to g-line. In the diagram showing coma, coma aberrations are shown relative to image heights Y=0, 10.8, 15.1, 18.4 and 21.6. As is apparent from the respective diagrams showing the various aberrations, excellent correction is made for the various aberrations at the respective image distance and at the respective focal lengths.

(sixth embodiment)

TABLE 6

| f | = | 39.90 | 60.72 | 98.41 | 152.00 |
|---|---|---|---|---|---|
| FNO | = | 5.09 | 7.15 | 9.84 | 12.05 |
| 2ω | = | 54.47° | 38.09° | 24.15° | 15.80° |

| surface number | radius of curvature | interval between the surfaces | refractive index | Abbe constant | |
|---|---|---|---|---|---|
| 1 | 43.2118 | 3.30 | 1.49700 | 81.61 | G1 |
| 2 | −39.3784 | 0.80 | 1.72825 | 28.31 | |
| 3 | −77.6290 | D3 variable | | | |
| 4 | −18.0367 | 0.80 | 1.83500 | 42.97 | G2 |
| 5 | 6.4775 | 3.00 | 1.80610 | 33.27 | |
| 6 | −153.6756 | 1.00 | | | |
| 7 | ∞ | 3.20 | Aperture diaphragm S | | |
| 8* | 36.6873 | 3.50 | 1.58313 | 59.44 | |
| 9 | −7.5545 | 0.80 | 1.72825 | 28.31 | |
| 10 | −12.5499 | D10 variable | | | |
| 11* | −121.7774 | 3.65 | 1.68893 | 31.16 | G3 |
| 12* | −27.3756 | 3.95 | | | |
| 13 | −11.9075 | 1.00 | 1.75500 | 52.32 | |
| 14 | 1000.0000 | (Bf) | | | |

Data for the aspherical surfaces

| | surface number | | |
|---|---|---|---|
| | 8 | 11 | 12 |
| R | 36.6873 | −121.7774 | −27.3756 |
| κ | 1.5408 | 1.0000 | 1.0000 |
| $C_4$ | $-4.4260 \times 10^{-5}$ | $+2.8935 \times 10^{-5}$ | $-1.4187 \times 10^{-5}$ |
| $C_6$ | $+3.7602 \times 10^{-7}$ | $-5.2001 \times 10^{-7}$ | $-5.8498 \times 10^{-7}$ |
| $C_8$ | $-4.7150 \times 10^{-9}$ | $+1.3119 \times 10^{-8}$ | $+1.2158 \times 10^{-8}$ |
| $C_{10}$ | $+2.8538 \times 10^{-10}$ | $-1.3694 \times 10^{-10}$ | $-1.3066 \times 10^{-10}$ |

Variable interval during zooming

| f | 39.8988 | 60.7218 | 98.4069 | 151.9913 |
|---|---|---|---|---|
| D3 | 1.3000 | 5.7458 | 13.9369 | 23.3766 |
| D10 | 17.1487 | 11.0250 | 5.5126 | 0.8000 |
| Bf | 11.8703 | 27.5797 | 50.7532 | 75.8184 |

Values for the above conditions f1 = 67.1317
f2 = 34.2540
f3 = −24.9231
(7) f12T/f12W = 1.365
(8) (|r2N| + |r2P|)/f2 = 0.893
(9) nd1 = 1.497
(10) vd1 = 81.6
(11) f3P/|f3N| = 3.239

(seventh embodiment)

TABLE 7

| f | = | 39.90 | 61.07 | 98.87 | 152.00 |
|---|---|---|---|---|---|
| FNO | = | 5.00 | 7.08 | 9.77 | 12.00 |
| 2ω | = | 54.94° | 37.49° | 23.90° | 15.74° |

| surface number | radius of curvature | interval between the surfaces | refractive index | Abbe constant | |
|---|---|---|---|---|---|
| 1 | 44.7195 | 3.50 | 1.49700 | 81.61 | G1 |
| 2 | −34.8488 | 0.80 | 1.80610 | 33.27 | |
| 3 | −63.1956 | D3 variable | | | |
| 4 | −15.7708 | 0.80 | 1.80610 | 33.27 | G2 |
| 5 | 6.6332 | 3.50 | 1.74077 | 27.76 | |
| 6 | −31.9168 | 1.00 | | | |
| 7 | ∞ | 1.75 | Aperture diaphragm S | | |
| 8* | 75.5596 | 3.70 | 1.51450 | 63.05 | |
| 9 | −7.2147 | 0.80 | 1.69895 | 30.05 | |
| 10 | −10.6354 | D10 variable | | | |

TABLE 7-continued

| f | = | 39.90 | 61.07 | 98.87 | 152.00 | |
|---|---|---|---|---|---|---|
| FNO | = | 5.00 | 7.08 | 9.77 | 12.00 | |
| 2ω | = | 54.94° | 37.49° | 23.90° | 15.74° | |
| 11* | −216.2687 | 2.90 | | 1.68893 | 31.16 | G3 |
| 12* | −33.1180 | 4.45 | | | | |
| 13 | −11.9712 | 1.00 | | 1.75500 | 52.32 | |
| 14 | 1000.0000 | (Bf) | | | | |

Data for the aspherical surfaces

| | surface number | | |
|---|---|---|---|
| | 8 | 11 | 12 |
| R | 75.5596 | −216.2687 | −33.1180 |
| κ | 9.1298 | 1.0000 | 1.0000 |
| $C_4$ | $-3.3257 \times 10^{-5}$ | $+3.0266 \times 10^{-5}$ | $-1.2413 \times 10^{-5}$ |
| $C_6$ | $+5.7195 \times 10^{-7}$ | $-2.8135 \times 10^{-7}$ | $-4.7288 \times 10^{-7}$ |
| $C_8$ | $-2.8183 \times 10^{-9}$ | $+7.8161 \times 10^{-9}$ | $-9.4495 \times 10^{-9}$ |
| $C_{10}$ | $+5.8819 \times 10^{-10}$ | $-1.2159 \times 10^{-10}$ | $-1.3066 \times 10^{-10}$ |

Variable interval during zooming

| f | 39.9028 | 61.0692 | 98.8733 | 152.0185 |
|---|---|---|---|---|
| D3 | 1.3000 | 5.7231 | 13.8726 | 23.2642 |
| D10 | 17.0189 | 10.9030 | 5.4539 | 0.8000 |
| Bf | 11.2650 | 26.6700 | 49.2537 | 73.6455 |

Values for the above conditions f1 = 67.1833
f2 = 35.6098
f3 = −24.1410
(7) f12T/f12W = 1.349
(8) (|r2N| + |r2P|)/f2 = 0.742
(9) nd1 = 1.497
(10) vd1 = 81.6
(11) f3P/|f3N| = 3.601

(Eighth through Tenth Embodiments)

In the present eighth through tenth embodiments, it is desirable to satisfy following condition (12);

$$0.3 < fw \cdot \Delta 1/(f1 \cdot f2) < 0.45 \qquad (12)$$

Where fw denotes a focal length of the variable focal length lens system in the wide-angle end state, Δ1 denotes the amount of variation of the space(air gap) between the first lens group and the second lens group from the wide-angle end state to the telephoto end state, f1 denotes the focal length of the first lens group, and f2 denotes the focal length of the second lens group.

Condition (12) defines the variation of composite refractive power of the first lens group and the second lens group, and relates to aforementioned condition (A). Here, the space(air gap) between the principal point of the first lens group and that of the second lens group in the wide-angle end state is d1w, and the space(air gap) in the telephoto end state is d1t. The composite refractive power φ12w of the first lens group and the second lens group in the wide-angle end state and that φ12t in the telephoto end state are represented by following equations respectively;

$$\phi 12w = 1/f1 + 1/f2 - d1w/(f1 \cdot f2)$$

$$\phi 12t = 1/f1 + 1/f2 - d1t/(f1 \cdot f2).$$

Further, the variation of composite refractive power φ12(= 12t−φ12w) is represented by the following equation;

$$\Delta \phi 12 = (d1t - d1w)/(f1 \cdot f2) = \Delta 1/(f1 \cdot f2).$$

As shown in above equations, condition (12) defines the variation of the focal length of the first lens group and the second lens group. When the value fw·Δ1/(f1·f2) exceeds the upper limit of condition (12), off-axis light flux passing through the first lens group passes away from the optical axis in the telephoto end state and, therefore, the diameter of the lens system becomes larger. On the other hand, when the value falls below the lower limit of condition (12), the lateral magnification of the third lens group varies drastically while the state of lens group positions is changed. As a result, a negative amount of curvature of field is produced drastically in the telephoto end state.

In order to obtain more preferable optical qualities, it is desirable that the upper limit of condition (12) is set to be 0.41 and the lower limit of condition (12) is set to be 0.33.

In the present eighth through tenth embodiments, in order to obtain better optical qualities, it is desirable to satisfy at least one of following conditions (13) and (14);

$$0.05 < Ds/f2 < 0.20 \qquad (13)$$

$$0.25 < |f3|/f1 < 0.50 \qquad (14).$$

Where Ds denotes the space(air gap) along the optical axis between the negative sub lens group and the positive sub lens group of the second lens group, and f3 denotes the focal length of the third lens group (f3<0).

Condition (13) defines the space(air gap) between the negative sub lens group and the positive sub lens group being comprised within the second lens group.

When the ratio Ds/f2 exceeds the upper limit of condition (13), off-axis light flux passing through the first lens group and the third lens group pass away from the optical axis and, therefore, the diameter of the lens system becomes larger. This is undesirable. On the other hand, when the ratio falls below the lower limit of condition (13), the refractive powers of the negative sub lens group and the positive sub lens group become stronger. As a result, off-axis optical qualities especially in the wide-angle end state become worse. Furthermore, degradation of optical qualities produced by mutual eccentricity between the negative sub lens group and the positive sub lens group occurring in the manufacturing process becomes substantially larger. Therefore, it becomes difficult to produce high quality, stable products, and the product being satisfactory with customers cannot be provided to the market.

Condition (14) defines the ratio of the focal length of the first lens group to that of the third lens group in order to balance the reduction of the total lens length and the reduction of the diameter of the lens system.

When the ratio |f3|/f1 exceeds the upper limit of condition (14), the reduction of the total lens length can easily be realized, but, off-axis light flux passing through the third lens group passes away from the optical axis in the wide-angle end state. And off-axis light flux passing through the first lens group passes away from the optical axis in the telephoto end state. As a result, the diameter of the lens system becomes larger, so this spoils portability of the camera body. On the other hand, when the ratio falls below the lower limit of condition (14), the total lens length becomes larger, so that this is undesirable.

In the present eighth through tenth embodiments, in order that the variation of coma generated with respect to wavelength in the wide-angle end state is corrected well, it is desirable that the negative sub lens group of the second lens group includes a negative compound lens, comprising a double concave lens element and a double convex lens element, and that the positive sub lens group of the second lens group includes positive compound lens, comprising a double convex lens element and a negative meniscus lens element. It is desirable to satisfy at least one of following conditions (15) and (16);

$$5<(\nu1N-\nu1P)<20 \tag{15}$$

$$25<(\nu2P-\nu2N)<40 \tag{16}.$$

Where ν1N denotes Abbe number of the negative lens element of the negative sub lens group, ν1P denotes Abbe number of the positive lens element of the negative sub lens group, ν2N denotes Abbe number of the negative lens element of the positive sub lens group, and ν2P denotes Abbe number of the positive lens element of the positive sub lens group respectively.

Condition (15) defines the difference between Abbe numbers of the negative lens element of the negative sub lens group and that of the positive lens element of the negative sub lens group of the second lens group. Condition (15) is for controlling the variation of lower coma in the wide-angle end state relative to wavelength.

There is no high-refractive-index optical glass being able to make secondary spectrum small. In the present eighth through tenth embodiments, by means of cementing the glass materials having relatively small difference of Abbe number with each other and making the radius of curvature of the cemented surface smaller, a high-order chromatic aberration is produced by the cemented surface, so that the similar effect as reducing secondary spectrum is obtained.

When the value (ν1N–ν1P) exceeds the upper limit of condition (15), the radius of curvature of the cemented surface becomes larger, so that high-order chromatic aberration produced on the cemented surface becomes weaker. As a result, it is difficult to correct the variation of coma relative to wavelength. On the other hand, when the value falls below the lower limit of condition (15), the radius of curvature of the cemented surface becomes too small to correct high-order chromatic aberration produced by on-axis light flux.

Condition (16) defines the difference of Abbe number between the positive lens element of the positive sub lens group and that of the negative lens element of the positive sub lens group of second lens group. Condition (16) is for controlling the variation of upper coma in the wide-angle end state relative to wavelength.

When the value (ν2P–ν2N) exceeds the upper limit of condition (16), the radius of curvature of the cemented surface becomes larger, so that high-order chromatic aberration produced by the cemented surface becomes weaker. As a result, it is difficult to correct the variation of coma relative to wavelength. On the other hand, when the value falls below the lower limit of condition (15), the radius of curvature of the cemented surface becomes too small to correct high-order chromatic aberration produced by on-axis light flux.

It is more preferable for the present eighth through tenth embodiments to satisfy both conditions (15) and (16), so that higher optical quality can be obtained.

In the present eighth through tenth embodiments, although the total lens length is made shorter by means of making the refractive power of the first lens group stronger, if the focal length of the first lens group is set to satisfy the following condition (17), the compactness of the diameter of the lens system and the shortening of the total lens length can be made effectively;

$$0.75<f1/(fw\cdot ft)^{1/2}<0.90 \tag{17}.$$

Where ft denotes the focal length of the variable focal length lens system in the telephoto end state.

When the ratio $f1/(fw\cdot ft)^{1/2}$ exceeds the upper limit of condition (17), the refractive power of the first lens group becomes weaker, so that the total lens length in the telephoto end state becomes larger. On the other hand, when the ratio falls below the lower limit of condition (17), off-axis light flux passing through the first lens group passes away from the optical axis in the telephoto end state, so that the diameter of the lens system becomes larger. This is undesirable.

Especially in the present eighth through tenth embodiments, when the refractive power of the first lens group is made stronger, the correction of the chromatic aberration in the telephoto end state cannot be made enough. It is desirable for the good correction of the chromatic aberration that the first lens group is comprised of a positive compound lens, comprising a double convex lens element and a negative lens element facing a concave surface to the object side, and that the double convex lens element is made from glass material having high anomalous dispersion.

Furthermore, in the present eighth through tenth embodiments, in order to shorten the total lens length and to make the diameter of the third lens group smaller, it is desirable that the third lens group is comprised of a positive lens element and a negative lens element located to the image side of the positive lens element separated with an air space(air gap). It is desirable to satisfy following condition (18);

$$0.12<d3/|f3|<0.24 \tag{18}.$$

Where d3 denotes the air space(air gap) along the optical axis between the positive lens element and the negative lens element of the third lens group.

When the ratio d3/|f3| exceeds the upper limit of condition (18), a large amount of positive distortion is produced and, therefore, this is undesirable. On the other hand, when the ratio falls below the lower limit of condition (18), the total lens length becomes larger and, therefore, this is undesirable.

(eighth embodiment)

TABLE 8

| f   | = | 39.90   | 60.96  | 98.73  | 152.01  |
|-----|---|---------|--------|--------|---------|
| FNO | = | 5.04    | 7.12   | 9.80   | 12.00   |
| 2ω  | = | 54.81°  | 37.69° | 24.01° | 15.80°  |

| surface number | radius of curvature | interval between the surfaces | refractive index | Abbe constant | |
|---|---|---|---|---|---|
| 1  | 43.3115   | 3.49        | 1.49700 | 81.61 | G1 |
| 2  | −34.1577  | 0.80        | 1.80610 | 33.27 |    |
| 3  | −61.8163  | D3 variable |         |       |    |
| 4  | −18.5765  | 0.80        | 1.83500 | 42.97 | G2 |
| 5  | 7.5628    | 2.67        | 1.80518 | 25.46 |    |
| 6  | 459.3776  | 2.00        |         |       |    |
| 7  | ∞         | 2.29        | Aperture diaphragm S | | |
| 8* | 26.4514   | 4.00        | 1.51450 | 63.05 |    |
| 9  | −6.7003   | 0.80        | 1.74950 | 35.04 |    |
| 10 | −10.6486  | D10 variable |        |       |    |
| 11*| −136.7422 | 2.80        | 1.68893 | 31.16 | G3 |
| 12*| −30.7560  | 4.51        |         |       |    |
| 13 | −12.0486  | 1.00        | 1.75500 | 52.32 |    |
| 14 | 1000.0000 | (Bf)        |         |       |    |

TABLE 8-continued

| f   | =   | 39.90   | 60.96   | 98.73   | 152.01  |
|-----|-----|---------|---------|---------|---------|
| FNO | =   | 5.04    | 7.12    | 9.80    | 12.00   |
| 2ω  | =   | 54.81°  | 37.69°  | 24.01°  | 15.80°  |

Data for the aspherical surfaces

| | surface number | | |
|---|---|---|---|
| | 8 | 11 | 12 |
| R | 26.4514 | −136.7422 | −30.7560 |
| κ | 11.0000 | 1.0000 | 1.0000 |
| $C_4$ | $-1.2232 \times 10^{-4}$ | $+3.9317 \times 10^{-5}$ | $-4.2884 \times 10^{-8}$ |
| $C_6$ | $+2.1803 \times 10^{-7}$ | $-3.4816 \times 10^{-7}$ | $-4.8176 \times 10^{-7}$ |
| $C_8$ | $-2.2055 \times 10^{-8}$ | $+1.5908 \times 10^{-8}$ | $+1.7644 \times 10^{-8}$ |
| $C_{10}$ | $+9.2158 \times 10^{-10}$ | $-2.0149 \times 10^{-10}$ | $-2.1000 \times 10^{-10}$ |

Variable interval during zooming

| f | 39.9021 | 60.9626 | 98.7289 | 152.0135 |
|---|---|---|---|---|
| D3 | 1.3000 | 5.5567 | 13.3995 | 23.4377 |
| D10 | 17.0710 | 10.9817 | 5.5084 | 0.8000 |
| Bf | 11.3173 | 26.6766 | 49.2295 | 73.6205 |

Values for the above conditions f1 = 65.1726
f2 = 34.8902
f3 = −24.1547
(12) fw · Δ1/(f1 · f2) = 0.371
(13) Ds/f2 = 0.123
(14) |f3|/f1 = 0.371
(15) ν1N − ν1P = 17.5
(16) ν2P − ν2N = 28.0
(17) f1/(fw · ft)½ = 0.837
(18) d3/|f3| = 0.187

(ninth embodiment)

TABLE 9

| f   | =   | 39.90   | 60.72   | 98.41   | 152.00  |
|-----|-----|---------|---------|---------|---------|
| FNO | =   | 5.09    | 7.15    | 9.84    | 12.05   |
| 2ω  | =   | 54.47°  | 38.09°  | 24.15°  | 15.80°  |

| surface number | radius of curvature | interval between the surfaces | refractive index | Abbe constant | |
|---|---|---|---|---|---|
| 1 | 43.2118 | 3.30 | 1.49700 | 81.61 | G1 |
| 2 | −39.3784 | 0.80 | 1.72825 | 28.31 | |
| 3 | −77.6290 | D3 variable | | | |
| 4 | −18.0367 | 0.80 | 1.83500 | 42.97 | G2 |
| 5 | 6.4775 | 3.00 | 1.80610 | 33.27 | |
| 6 | −153.6756 | 1.00 | | | |
| 7 | ∞ | 3.20 | Aperture diaphragm S | | |
| 8* | 36.6873 | 3.50 | 1.58913 | 59.44 | |
| 9 | 7.5545 | 0.80 | 1.72825 | 28.31 | |
| 10 | −12.5499 | D10 variable | | | |
| 11* | −121.7774 | 3.65 | 1.68893 | 31.16 | G3 |
| 12* | −27.3756 | 3.95 | | | |
| 13 | −11.9075 | 1.00 | 1.75500 | 52.32 | |
| 14 | 1000.0000 | (Bf) | | | |

Data for the aspherical surfaces

| | surface number | | |
|---|---|---|---|
| | 8 | 11 | 12 |
| R | 36.6873 | −121.7774 | −27.3756 |
| κ | 1.5408 | 1.0000 | 1.0000 |
| $C_4$ | $-4.4260 \times 10^{-5}$ | $+2.8935 \times 10^{-5}$ | $-1.4187 \times 10^{-8}$ |
| $C_6$ | $+3.7602 \times 10^{-7}$ | $-5.2001 \times 10^{-7}$ | $-5.8498 \times 10^{-7}$ |
| $C_8$ | $-4.7150 \times 10^{-9}$ | $+1.3119 \times 10^{-8}$ | $+1.2158 \times 10^{-8}$ |
| $C_{10}$ | $+2.8538 \times 10^{-10}$ | $-1.3694 \times 10^{-10}$ | $-1.3066 \times 10^{-10}$ |

TABLE 9-continued

| f   | =   | 39.90   | 60.72   | 98.41   | 152.00  |
|-----|-----|---------|---------|---------|---------|
| FNO | =   | 5.09    | 7.15    | 9.84    | 12.05   |
| 2ω  | =   | 54.47°  | 38.09°  | 24.15°  | 15.80°  |

Variable interval during zooming

| f | 39.8988 | 60.7218 | 98.4069 | 151.9913 |
|---|---|---|---|---|
| D3 | 1.3000 | 5.7458 | 13.9369 | 23.3766 |
| D10 | 17.1487 | 11.0250 | 5.5126 | 0.8000 |
| Bf | 11.8703 | 27.5797 | 50.7532 | 75.8184 |

Values for the above conditions f1 = 67.1317
f2 = 34.2540
f3 = −24.9321
(12) fw · Δ1/(f1 · f2) = 0.383
(13) Ds/f2 = 0.123
(14) |f3|/f1 = 0.371
(15) ν1N − ν1P = 9.7
(16) ν2P − ν2N = 31.1
(17) f1/(fw · ft)½ = 0.862
(18) d3/|f3| = 0.158

(tenth embodiment)

TABLE 10

| f   | =   | 39.90   | 61.07   | 98.87   | 152.00  |
|-----|-----|---------|---------|---------|---------|
| FNO | =   | 5.00    | 7.08    | 9.77    | 12.00   |
| 2ω  | =   | 54.94°  | 37.49°  | 23.90°  | 15.74°  |

| surface number | radius of curvature | interval between the surfaces | refractive index | Abbe constant | |
|---|---|---|---|---|---|
| 1 | 44.7195 | 3.50 | 1.49700 | 81.61 | G1 |
| 2 | −34.8488 | 0.80 | 1.80610 | 33.27 | |
| 3 | −63.1956 | D3 variable | | | |
| 4 | −15.7708 | 0.80 | 1.80610 | 33.27 | G2 |
| 5 | 6.6332 | 3.50 | 1.74077 | 27.76 | |
| 6 | −31.9168 | 1.00 | | | |
| 7 | ∞ | 1.75 | Aperture diaphragm S | | |
| 8* | 75.5596 | 3.70 | 1.5145 | 63.05 | |
| 9 | −7.2417 | 0.80 | 1.69895 | 30.05 | |
| 10 | −10.6354 | D10 variable | | | |
| 11* | −216.2687 | 2.90 | 1.68893 | 31.16 | G3 |
| 12* | −33.1180 | 4.45 | | | |
| 13 | −11.9712 | 1.00 | 1.75500 | 52.32 | |
| 14 | 1000.0000 | (Bf) | | | |

Data for the aspherical surfaces

| | surface number | | |
|---|---|---|---|
| | 8 | 11 | 12 |
| R | 75.5596 | −216.2687 | −33.1180 |
| κ | 9.1298 | 1.0000 | 1.0000 |
| $C_4$ | $-3.3257 \times 10^{-5}$ | $+3.0266 \times 10^{-5}$ | $-1.2413 \times 10^{-5}$ |
| $C_6$ | $+5.7195 \times 10^{-7}$ | $-2.8135 \times 10^{-7}$ | $-4.7288 \times 10^{-7}$ |
| $C_8$ | $-2.8183 \times 10^{-9}$ | $+7.8161 \times 10^{-9}$ | $+9.4495 \times 10^{-9}$ |
| $C_{10}$ | $+5.8819 \times 10^{-10}$ | $-1.2159 \times 10^{-10}$ | $-1.3066 \times 10^{-10}$ |

Variable interval during zooming

| f | 39.9028 | 61.0692 | 98.8733 | 152.0185 |
|---|---|---|---|---|
| D3 | 1.3000 | 5.7231 | 13.8726 | 23.2642 |
| D10 | 17.0189 | 10.9030 | 5.4539 | 0.8000 |
| Bf | 11.2650 | 26.6770 | 49.2537 | 73.6455 |

Values for the above conditions f1 = 67.1833
f2 = 35.6098
f3 = −24.1410
(12) fw · Δ1/(f1 · f2) = 0.383

TABLE 10-continued

| f | = | 39.90 | 61.07 | 98.87 | 152.00 |
|---|---|---|---|---|---|
| FNO | = | 5.00 | 7.08 | 9.77 | 12.00 |
| 2ω | = | 54.94° | 37.49° | 23.90° | 15.74° |

(13) Ds/f2 = 0.077
(14) |f3|/f1 = 0.366
(15) ν1N − ν1P = 5.5
(16) ν2P − ν2N = 33.0
(17) f1/(fw · ft)½ = 0.863
(18) d3/|f3| = 0.184

(Other Variations)

In the present invention, it is possible to reduce weight and cost by means of introducing plastics for lens materials instead of glass materials.

Plastics can be cast in relatively lower temperature than glass materials, so it is easy to manufacture products, and, therefore, it is suitable for reducing manufacturing cost.

When a lens barrel for a zoom lens system keeping lenses is made from plastics, the length of the lens barrel changes in accordance with change in the temperature. It is possible that the change of the image position relative to the change in the length of the lens barrel resulted from change in the temperature can be eased by means of using plastics for the lens materials.

In the present invention, when the positive lens located in the third lens group is made from plastics, the reduction of manufacturing cost and a high optical quality can be obtained simultaneously and, therefore, this is the most preferable. An aspherical lens made from plastics can be lighter in the weight and cheaper to produce than an aspherical lens made from glass. Moreover, since off-axis light flux passing through the third lens group passes near to the optical axis relative to the diameter of the lenses in the telephoto end state, predetermined optical quality can be obtained without very high surface accuracy.

Aspherical lenses are used in the second lens group and the third lens group in each embodiment of the present invention. The negative spherical aberration generated independently in the second lens group and the variation of on-axis aberration generated by changing the state of focal length can be corrected well by means of arranging an aspherical lens in the second lens group. The variation of off-axis aberration generated when the state of the focal length is changed from the wide-angle end state to the telephoto end state can be corrected well by means of arranging an aspherical lens in the third lens group.

Although the lens system in each embodiment of the present invention consists of three movable lens groups, another lens group can easily be added between each lens group, or another lens group can easily be added to the image side or to the object side of the lens system.

From another point of view, it is possible to combine a moving detector detecting the movement of the lens system and a driving means with the lens system in each embodiment of the present invention in order to prevent failure of taking a picture caused by image blurring liable to be generated by camera-shake, or the like, with the high-zoom-ratio zoom lens. By means of decentering a lens group, or a part of a lens group, composing the lens system as a shift lens group, the image can be shifted. Therefore, it is possible for the variable focal length lens system of the present invention to be an anti-vibration lens system by means of correcting the image blurring (variation of image plane) caused by the movement of the lens system detected by the moving detector.

What is claimed is:

1. A variable focal length lens system comprising:
   a first lens group having a positive refractive power;
   a second lens group having a positive refractive power disposed to an image side of said first lens group; and
   a third lens group having a negative refractive power disposed to the image side of said second lens group;
   wherein said third lens group consists of a positive lens element and a negative lens element arranged to the image side of said positive lens element; and
   wherein said first lens group, said second lens group, and said third lens group are moved toward an object in such a manner that an air gap between said first lens group and said second lens group is increased, and a space between said second lens group and said third lens group is decreased when a state of the focal length is changed from a wide-angle end state to a telephoto end state; and the following condition is satisfied:

$0.28 < f1/ft < 0.48$;

where f1 denotes a focal length of said first lens group, and ft denotes a focal length of the lens system in the telephoto end state.

2. A variable focal length lens system according to claim 1,
   wherein said second lens group is comprised of:
      an aperture diaphragm,
      a negative sub lens group having a negative refractive power arranged to the object side of said aperture diaphragm, and
      a positive sub lens group having a positive refractive power arranged to the image side of said aperture diaphragm, and the following condition is satisfied:

$0.4 < f2/(fw \cdot ft)^{1/2} < 0.8$;

where f2 denotes a focal length of said second lens group, fw denotes a focal length of the lens system in the wide-angle end state, and ft denotes the focal length of the lens system in the telephoto end state.

3. A variable focal length lens system according to claim 2,
   wherein the following condition is satisfied:

$0.15 < \Delta 1/f1 < 0.3$;

where Δ1 denotes a variation of a space along the optical axis between said first lens group and said second lens group when a state of the focal length is changed from the wide-angle end state to the telephoto end state, and f1 denotes the focal length of said first lens group.

4. A variable focal length lens system according to claim 3,
   wherein said first lens group is comprised of:
      a cemented positive lens composed of a double-convex lens element and a negative meniscus lens element facing a concave surface to the object side; and the following condition is satisfied:

$3 < |Ra|/Da < 6$;

where Ra denotes a radius of curvature of a cemented surface of said cemented positive lens in the first lens group, and Da denotes a distance along the optical axis between said cemented surface of said cemented positive lens in the first lens group and said aperture diaphragm in said second lens group in a wide-angle end state.

5. A variable focal length lens system according to claim 2, wherein the following condition is satisfied:

$$0.6<(|f2a|+f2b)/f2<1.8;$$

where f2 denotes the focal length of said second lens group, f2a denotes a focal length of said negative sub lens group in said second lens group, and f2b denotes a focal length of said positive sub lens group in said second lens group.

6. A variable focal length lens system according to claim 1, wherein said first lens group is comprised of:
a cemented positive lens composed of a double-convex lens element and a negative meniscus lens element facing a concave surface to the object side; and the following condition is satisfied:

$$3<|Ra|/Da<6;$$

where Ra denotes a radius of curvature of a cemented surface of said cemented positive lens in the first lens group, and Da denotes a distance along the optical axis between said cemented surface of said cemented positive lens in the first lens group and said aperture diaphragm in said second lens group in a wide-angle end state.

7. A variable focal length lens system according to claim 4, wherein the following condition is satisfied:

$$0.6<(|f2a|+f2b)/f2<1.8;$$

where f2 denotes the focal length of said second lens group, f2a denotes a focal length of said negative sub lens group in said second lens group, and f2b denotes a focal length of said positive sub lens group in said second lens group.

8. A variable focal length lens system according to claim 1, wherein the following condition is satisfied:

$$1.4<f1/|f3|<2.8;$$

where f1 denotes the focal length of said first lens group, and f3 denotes a focal length of said third lens group.

9. A variable focal length lens system comprising, in order from an object side:
a first lens group having a positive refractive power;
a second lens group having a positive refractive power; and
a third lens group having a negative refractive power;
wherein said first lens group, said second lens group, and said third lens group are moved toward the object in such a manner that a space between said first lens group and said second lens group is increased, and a space between said second lens group and said third lens group is decreased when a state of the focal length is changed from a wide-angle end state to a telephoto end state; and the following condition is satisfied:

$$1.10<f12T/f12W<1.50;$$

where f12W denotes a combined focal length of said first lens group and said second lens group in the wide-angle end state, and f12T denotes a combined focal length of said first lens group and said second lens group in the telephoto end state.

10. A variable focal length lens system according to claim 9, wherein said second lens group is comprised of:
an aperture diaphragm,
a negative sub lens group having a negative refractive power arranged to the object side of said aperture diaphragm, and
a positive sub lens group having a positive refractive power arranged to the image side of said aperture diaphragm, and the following condition is satisfied:

$$0.50<(|r2N|+|r2P|)/f2<1.00;$$

where f2 denotes a focal length of said second lens group, r2N denotes a radius of curvature of a surface, located the most toward the object side, of said negative sub lens group of said second lens group, and r2P denotes a radius of curvature of a surface, located the most toward the image side, of said positive sub lens group of said second lens group.

11. A variable focal length lens system according to claim 10, wherein said first lens group is comprised of:
a positive lens element, and
a negative lens element, and
at least one of the following conditions is satisfied:

$$nd1<1.50$$

$$vd1>75$$

where nd1 denotes refractive index of said positive lens element of said first lens group for the d-line (λ=587.6 nm), and vd1 denotes Abbe number of said positive lens element of said first lens group.

12. A variable focal length lens system according to claim 11, wherein said third lens group is comprised of:
a positive sub lens group having a positive refractive power, and
a negative sub lens group having a negative refractive power, and
the following condition is satisfied:

$$2.5<f3P/|f3N|<5.0;$$

where f3P denotes a focal length of said positive sub lens group in said third lens group, and f3N denotes a focal length of said negative sub lens group in said third lens group.

13. A variable focal length lens system according to claim 9, wherein said first lens group is comprised of:
a positive lens element, and
a negative lens element, and
at least one of the following conditions is satisfied:

$$nd1<1.50$$

$$vd1>75$$

where nd1 denotes refractive index of said positive lens element of said first lens group for the d-line (λ=587.6 nm), and vd1 denotes Abbe number of said positive lens element of said first lens group.

14. A variable focal length lens system according to claim 9,
wherein said third lens group is comprised of:
a positive sub lens group having a positive refractive power, and
a negative sub lens group having a negative refractive power, and
the following condition is satisfied:

$$2.5 < f3P/|f3N| < 5.0;$$

where f3P denotes a focal length of said positive sub lens group in said third lens group, and f3N denotes a focal length of said negative sub lens group in said third lens group.

15. A variable focal length optical system comprising, in order from an object side:
a first lens group having a positive refractive power;
a second lens group having a positive refractive power; and
a third lens group having a negative refractive power;
wherein said first lens group, said second lens group, and said third lens group are moved toward the object in such a manner that a space between said first lens group and said second lens group is increased, and a space between said second lens group and said third lens group is decreased when a state of the focal length is changed from a wide-angle end state to a telephoto end state; and
said second lens group is comprised of:
an aperture diaphragm,
a negative sub lens group having a negative refractive power arranged to the object side of said aperture diaphragm, and
a positive sub lens group having a positive refractive power arranged to the image side of said aperture diaphragm, and
the following condition is satisfied:

$$0.3 < fw \cdot \Delta 1/(f1 \cdot f2) < 0.45;$$

where fw denotes a focal length of the variable focal length optical system in the wide-angle end state, $\Delta 1$ denotes a variation of the space between said first lens group and said second lens group when the system goes from the wide-angle end state to the telephoto end state, f1 denotes a focal length of said first lens group, and f2 denotes a focal length of said second lens group.

16. A variable focal length lens system according to claim 15,
wherein at least one of the following conditions is satisfied:

$$0.05 < Ds/f2 < 0.20$$

$$0.25 < |f3|/f1 < 0.50;$$

where Ds denotes an air gap along an optical axis between said negative sub lens group and said positive sub lens group of said second lens group, and f3 denotes a focal length of said third lens group (f3<0) respectively.

17. A variable focal length lens system according to claim 15,
wherein said negative sub lens group is comprised of:
a cemented negative lens composed of
a double-concave negative lens element and
a double-convex positive lens element; and
said positive sub lens group is comprised of:
a cemented positive lens composed of
a double-convex positive lens element; and
a negative meniscus lens element; and
at least one of the following conditions is satisfied:

$$5 < (\nu 1N - \nu 1P) < 20$$

$$25 < (\nu 2P - \nu 2N) < 40;$$

where $\nu 1N$ denotes Abbe number of said negative lens element of said negative sub lens group, $\nu 1P$ denotes Abbe number of said positive lens element of said negative sub lens group, $\nu 2N$ denotes Abbe number of said negative lens element of said positive sub lens group, and $\nu 2P$ denotes Abbe number of said positive lens element of said positive sub lens group.

18. A variable focal length lens system comprising:
a first lens group having a positive refractive power;
a second lens group having a positive refractive power disposed to an image side of said first lens group; and
a third lens group having a negative refractive power disposed to the image side of said second lens group;
wherein said first lens group, said second lens group, and said third lens group are moved toward an object in such a manner that an air gap between said first lens group and said second lens group is increased, and a space between said second lens group and said third lens group is decreased when a state of the focal length is changed from a wide-angle end state to a telephoto end state; and the following condition is satisfied:

$$0.28 < f1/ft < 0.48;$$

where f1 denotes a focal length of said first lens group, and ft denotes a focal length of the lens system in the telephoto end state; and
wherein said second lens group is comprised of:
an aperture diaphragm,
a negative sub lens group having a negative refractive power arranged to the object side of said aperture diaphragm, and
a positive sub lens group having a positive refractive power arranged to the image side of said aperture diaphragm; and
the following condition is satisfied:

$$0.4 < f2/(fw \cdot ft)^{1/2} < 0.8;$$

where f2 denotes a focal length of said second lens group, fw denotes a focal length of the lens system in the wide-angle end state, and ft denotes the focal length of the lens system in the telephoto end state.

19. A variable focal length lens system according to claim 18,
wherein the following condition is satisfied:

$$0.15 < \Delta 1/f1 < 0.3;$$

where $\Delta 1$ denotes a variation of a space along the optical axis between said first lens group and said second lens group when a state of the focal length is changed from the wide-angle end state to the telephone end state, and f1 denotes the focal length of said first lens group.

20. A variable focal length lens system according to claim 19,
wherein said first lens group is comprised of:
a cemented positive lens composed of a double-convex lens element and a negative meniscus lens element facing a concave surface to the object side; and the following condition is satisfied:

$3 < |Ra|/Da < 6;$ where Ra denotes a radius of curvature of a cemented surface of said cemented positive lens in the first lens group, and Da denotes a distance along the optical axis between said cemented surface of said cemented positive lens in the first lens group and said aperture diaphragm in said second lens group in a wide-angle end state.

21. A variable focal length lens system according to claim 18,
wherein the following condition is satisfied:

$0.6 < (|f2a|+f2b)/f2 < 1.8;$ where f2 denotes the focal length of said second lens group, f2a denotes a focal length of said negative sub lens group in said second lens group, and f2b denotes a focal length of said positive sub lens group in said second lens group.

22. A variable focal length lens system comprising:
a first lens group having a positive refractive power;
a second lens group having a positive refractive power disposed to an image side of said first lens group; and
a third lens group having a negative refractive power disposed to the image side of said second lens group;
wherein said first lens group, said second lens group, and said third lens group are moved toward an object in such a manner that an air gap between said first lens group and said second lens group is increased, and a space between said second lens group and said third lens group is decreased when a state of the focal length is changed from a wide-angle end state to a telephoto end state; and
the following condition is satisfied:

$0.28 < f1/ft < 0.48;$ where f1 denotes a focal length of said first lens group, and ft denotes a focal length of the lens system in the telephoto end state; and
wherein said first lens group is comprised of:
a cemented positive lens composed of a double-convex lens element and a negative meniscus lens element facing a concave surface to the object side; and
the following condition is satisfied:

$3 < |Ra|/Da < 6;$ where Ra denotes a radius of curvature of a cemented surface of said cemented positive lens in the first lens group, and Da denotes a distance along the optical axis between said cemented surface of said cemented positive lens in the first lens group and said aperture diaphragm in said second lens group in a wide-angle end state.

23. A variable focal length lens system according to claim 22,
wherein said second lens group is comprised of:
an aperture diaphragm,
a negative sub lens group having a negative refractive power arranged to the object side of said aperture diaphragm, and
a positive sub lens group having a positive refractive power arranged to the image side of said aperture diaphragm; and
the following condition is satisfied:

$0.6 < (|f2a|+f2b)/f2 < 1.8;$ where f2 denotes a focal length of said second lens group, f2a denotes a focal length of said negative sub lens group in said second lens group, and f2b denotes a focal length of said positive sub lens group in said second lens group.

24. A variable focal length lens system according to claim 6,
wherein said second lens group is comprised of:
an aperture diaphragm,
a negative sub lens group having a negative refractive power arranged to the object side of said aperture diaphragm, and
a positive sub lens group having a positive refractive power arranged to the image side of said aperture diaphragm; and
the following condition is satisfied:

$0.6 < (|f2a|+f2b)/f2 < 1.8;$ where f2 denotes a focal length of said second lens group, f2a denotes a focal length of said negative sub lens group in said second lens group, and f2b denotes a focal length of said positive sub lens group in said second lens group.

* * * * *